(12) United States Patent
Sehgal et al.

(10) Patent No.: US 12,555,320 B2
(45) Date of Patent: *Feb. 17, 2026

(54) METHOD AND SYSTEM FOR DETERMINING SOLAR ACCESS OF A STRUCTURE

(71) Applicant: Eagle View Technologies, Inc., Rochester, NY (US)

(72) Inventors: Ajai Sehgal, Woodinville, WA (US); David Nilosek, Bothell, WA (US); Daniel Rojas, La Union (CR); George Chaves, Tambor (CR); Pete Cleveland, Redmond, WA (US)

(73) Assignee: Eagle View Technologies, Inc., Rochester, NY (US)

( * ) Notice: Subject to any disclaimer, the term of this patent is extended or adjusted under 35 U.S.C. 154(b) by 96 days.

This patent is subject to a terminal disclaimer.

(21) Appl. No.: 18/662,714

(22) Filed: May 13, 2024

(65) Prior Publication Data

US 2024/0378806 A1 Nov. 14, 2024

Related U.S. Application Data

(63) Continuation of application No. 18/151,245, filed on Jan. 6, 2023, now Pat. No. 11,983,813, which is a
(Continued)

(51) Int. Cl.
*G06T 17/05* (2011.01)
*G06F 30/13* (2020.01)
(Continued)

(52) U.S. Cl.
CPC .............. *G06T 17/05* (2013.01); *H02J 3/004* (2020.01); *G06F 30/13* (2020.01);
(Continued)

(58) Field of Classification Search
CPC ..... G06T 17/05; G06T 19/00; G06T 2210/56; H02J 3/004; G06F 30/13; G06F 2119/06;
(Continued)

(56) References Cited

U.S. PATENT DOCUMENTS 7,305,983 B1 12/2007 Meder et al.
7,424,133 B2 9/2008 Schultz et al.
(Continued)

FOREIGN PATENT DOCUMENTS

WO WO 2009/025928 A2 2/2009
WO WO 2011/150319 A2 12/2011

OTHER PUBLICATIONS

Pisklak, S., et al. "Combining Solmetric SunEye data with simple 3D modeling to improve residential photovoltaic shade impact predictions" IEEE 39th Photovoltaic Specialists Conf., PVSC (2013) available from <https://ieeexplore.ieee.org/abstract/document/6744269> (Year: 2013).*
(Continued)

*Primary Examiner* — Jay Hann
(74) *Attorney, Agent, or Firm* — DUNLAP CODDING, P.C.

(57) ABSTRACT

Methods and systems are disclosed for automatically determining solar access values, including a method including calculating a ray between a sun position and a structure vertex at a plurality of time periods; comparing a path of the ray to location of points in object point cloud data representative of the size, shape, and location of one or more objects to determine that the object(s) blocks the ray from reaching the vertex, resulting in a shadow over the vertex for at least one of the time periods; determining effects of the shadow over the vertex on the maximum possible irradiance values based on a determined distance and whether the vertex is within an umbra, penumbra, or antumbra of the
(Continued)

shadow at at least one of the time periods; and determining irradiance in Watts per time period over the plurality of time periods in which the shadow is over the vertex.

20 Claims, 19 Drawing Sheets

Related U.S. Application Data continuation of application No. 16/579,436, filed on Sep. 23, 2019, now Pat. No. 11,551,413.

(60) Provisional application No. 62/734,759, filed on Sep. 21, 2018.

(51) Int. Cl.
*G06T 19/00* (2011.01)
*H02J 3/00* (2006.01)
*G06F 119/06* (2020.01)

(52) U.S. Cl.
CPC .......... *G06F 2119/06* (2020.01); *G06T 19/00* (2013.01); *G06T 2210/56* (2013.01)

(58) Field of Classification Search
CPC G06F 30/20; Y02E 10/40; F24S 90/00; F24S 2020/16
See application file for complete search history.

(56) References Cited

U.S. PATENT DOCUMENTS

| | | | |
|---|---|---|---|
| 8,078,436 | B2 | 12/2011 | Pershing et al. |
| 8,145,578 | B2 | 3/2012 | Pershing et al. |
| 8,170,840 | B2 | 5/2012 | Pershing |
| 8,209,152 | B2 | 6/2012 | Pershing |
| 8,515,125 | B2 | 8/2013 | Thornberry et al. |
| 8,520,079 | B2 | 8/2013 | Schultz et al. |
| 8,977,520 | B2 | 3/2015 | Stephens et al. |
| 9,612,598 | B2 | 4/2017 | Schultz et al. |
| 9,697,644 | B2 | 7/2017 | Macdonald et al. |
| 10,402,676 | B2 | 9/2019 | Wang et al. |
| 2009/0125275 | A1 | 5/2009 | Woro |
| 2009/0234692 | A1 | 9/2009 | Powell et al. |
| 2012/0035887 | A1 | 2/2012 | Augenbraun et al. |
| 2014/0176543 | A1 | 6/2014 | Macdonald et al. |
| 2016/0004795 | A1 | 1/2016 | Novak |
| 2019/0188337 | A1 | 6/2019 | Keane |

OTHER PUBLICATIONS

Crocker, S. & Sullivan, C. "Predicting Shading of Photovoltaic Systems with Cell-Level Resolution" IEEE Energy Conversion Congress & Exposition (2013) available from <https://ieeexplore.ieee.org/abstract/document/6647301> (Year: 2013).*

Canadian Intellectual Property Office, Office Action regarding Canadian Patent Application No. 3,123,834, dated Mar. 13, 2024.

Eagle View Technologies, Inc., Response to Mar. 13, 2024 Office Action regarding Canadian Patent Application No. 3,123,834, dated Jul. 12, 2024.

IP Australia, Examination Report No. 1 regarding Australian Patent Application No. 2019345276, dated Jun. 3, 2024.

Lave et al., "Evaluation of Global Horizontal Irradiance to Plane-of-Array Irradiance Models at Locations Across the United States", IEEE J. Photovoltaics, vol. 5, No. 2, pp. 597-606, 2015.

Eagle View Technologies, Inc., Response to Oct. 12, 2023 Communication of Intent to Grant regarding European Patent Application No. 19783772.7, dated Feb. 7, 2024.

Eagle View Technologies, Inc., Response to Jul. 18, 2023 Communication of Intent to Grant regarding European Patent Application No. 19783772.7, dated Sep. 6, 2024.

European Patent Office, Extended European Search Report regarding European Patent Application No. 24188461.8, Dated Jan. 15, 2025.

Blair et al., "System Advisor Model (SAM) General Description," May 2018, Version 2017.9.5, National Renewable Energy Laboratory, Golden, CO.

Cameron et al., "Comparison of PV System Performance-Model Predictions with Measured PV System Performance," May 2008, 33rd IEEE Photovoltaic Specialists Conference (PVSC), IEEE, San Diego, CA.

Dobos, A. "*PVWatts Version 1 Technical Reference,*" Oct. 2013, Technical Report NREL/TP-6A20-60272, National Renewable Energy Laboratory, Golden, CO.

Habte et al., "Evaluation of the National Solar Radiation Database (NSRDB): 1998-2015," Apr. 2017, Technical Report NREL/TP-5D00-67722, National Renewable Energy Laboratory, Golden, CO.

Iqbal, M., "An Introduction to Solar Radiation," 1983, Academic Press, New York, NY.

King et al., "Photovoltaic Array Performance Model," Dec. 2004, Sandia Report SAND2004-3535, Sandia National Laboratories, Albuquerque, NM.

Liu, B., Jordan, R., "A Rational Procedure for Predicting The Long-term Average Performance of Flat-plate Solar-energy Collectors," 1963, pp. 53-74, vol. 7, No. 2, Solar Energy, USA.

Michalsky, J. J., "The Astronomical Almanac's Algorithm for Appropriate Solar Position (1950-2050)," 1988, pp. 227-235, vol. 40, No. 3, Solar Energy, USA.

Perez et al., "Modeling Daylight Availability and Irradiance Components from Direct and Global Irradiance," 1990, pp. 271-289, vol. 44, No. 5, Solar Energy, USA.

Perez et al., "An Anisotropic Hourly Diffuse Radiation Model for Sloping Surfaces: Description, Performance, Validation, Site Dependency Evaluation," 1986, pp. 481-497, vol. 36, No. 6, Solar Energy, USA.

Perez et al., "The Development and Verification of the Perez Diffuse Radiation Model," Oct. 1988, Contractor Report SAND88-7030, Sandia National Laboratories, Albuquerque, NM.

Pisklak et al., "Combining Solmetric SunEye Data with Simple 3D Modeling to Improve Residential Photovoltaic Shade Impact Predictions," Jun. 2013, 2013 IEEE 39th Photovoltaic Specialists Conference (PVSC), IEEE, Tampa, FL.

Pvperformance Modeling Collaborative, "Perez Sky Diffuse Model," Retrieved on Feb. 2014, from http://pvpmc.org:80/modeling-steps/incident-irradiance/plane-of-array-poa-irradiance/calculating-poa-irradiance/poa-sky-diffuse/perez-sky-diffuse-model/, Sandia National Laboratory, Albuquerque, NM.

European Patent Office acting as the International Searching Authority, International Search Report and Written Opinion regarding PCT/US2019/052257, Dec. 12, 2019.

European Patent Office acting as the International Searching Authority; International Preliminary Report on Patentability regarding PCT/US2019/052257, dated Mar. 23, 2021.

European Patent Office; Invitation to respond to International Preliminary Report on Patentability regarding PCT/US2019/052257 for European Patent Application No. 19783772.7, dated May 3, 2021.

Eagle View Technologies, Inc., Response to Invitation to respond to International Preliminary Report on Patentability regarding PCT/US2019/052257 for European Patent Application No. 19783772.7, dated Nov. 15, 2021.

\* cited by examiner

| | |
|---|---|
| G | 94% 87% |
| H | 94% 87% |
| I | 94% 87% |
| J | 94% 87% |
| K | 94% 87% |
| L | 94% 87% |
| M | 94% 87% |
| N | 94% 87% |
| O | 94% 87% |
| P | 94% 87% |
| Q | 94% 87% |

Prepared for

Contact: Tyler Natividad
Company: EV technologies
Address: 3700 Monte Villa Parkway
Bothell, WA, 98021
Phone: 425-555-5555

Measurements Provided by
 EAGLE VIEW®

Certified Accurate www.eagleview.com/Gurantee.aspx

This document is provided under License by EagleView Technologies to the requestor for their internal Use only subject to the terms and conditions previously agreed to by the requestor when they registered for use of EagleView Technologies Services.
It remains the property of EagleView Technologies and may be reproduced and distributed only within the requestor's company. Any reproduction or distribution to anyone outside of the requestor's company without EagleView's prior written permission is strictly prohibited. All aspects and handling of this report are subject to the Terms and Conditions previously agreed to by the requestor.

FIG. 8B

Roof Summary

26 Jerusalem Ave, Hempstead, NY 11550-6046

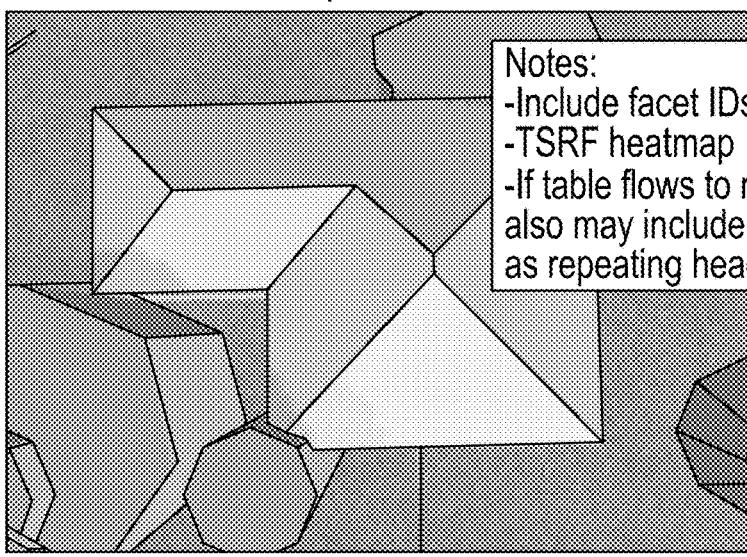

Notes:
-Include facet IDs
-TSRF heatmap
-If table flows to next page, also may include images as repeating header

*Total Solar Resource Fraction (TSRF)*

| Roof ID | Pitch | Azimuth | Annual Solar Access | May-Oct Solar Access | Nov-Apr Solar Access | Total Solar Resource Fraction (TSRF) |
|---|---|---|---|---|---|---|
| A | 26° | 274° | 94% | 87% | 85% | 87% |
| B | 26° | 274° | 94% | 87% | 85% | 87% |
| C | 26° | 274° | 94% | 87% | 85% | 87% |
| D | 26° | 274° | 94% | 87% | 85% | 87% |
| E | 26° | 274° | 94% | 87% | 85% | 87% |
| F | 26° | 274° | 94% | 87% | 85% | 87% |
| G | 26° | 274° | 94% | 87% | 85% | 87% |
| H | 26° | 274° | 94% | 87% | 85% | 87% |
| I | 26° | 274° | 94% | 87% | 85% | 87% |
| J | 26° | 274° | 94% | 87% | 85% | 87% |

SunSite Complete™ Report
For 26 Jerusalem Ave, Hempstead, NY 1155-6046
Report: 12345678

EAGLE VIEW®
July 11, 2018

Copyright © 2008-2018 EagleView Technologies, Inc. - All Rights Reserved-Covered by U.S. Patent Nos. 8,078,436; 8,145,578; 8,170,840; 8,209,152; 8,515,125. Other Patents Pending.

Page 1of12

FIG. 8C

Roof Facets
| Roof ID | Pitch | Azimuth | Annual Solar Access | May-Oct Solar Access | Nov-Apr Solar Access |
|---------|-------|---------|---------------------|----------------------|----------------------|
| G | 26° | 274° | 94% | 87% | 85% |
Roof Facet G with heatmap
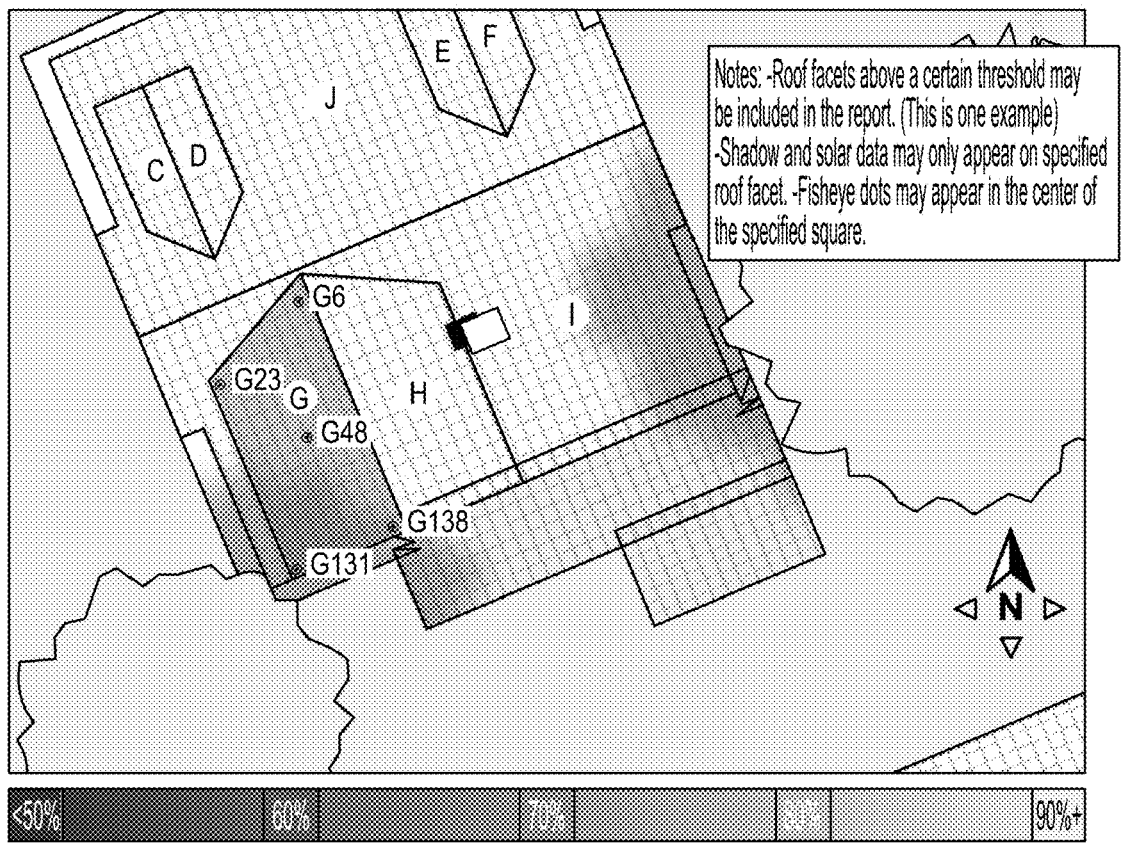
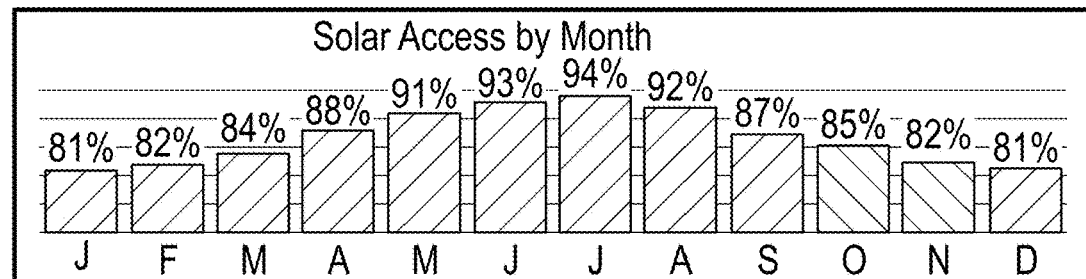
SunSite Complete™ Report
For 26 Jerusalem Ave, Hempstead, NY 1155-6046
Report: 12345678
EAGLE VIEW®
July 11, 2018
Copyright © 2008-2018 EagleView Technologies, Inc. - All Rights Reserved-Covered by U.S. Patent Nos. 8,078,436; 8,145,578; 8,170,840; 8,209,152; 8,515,125. Other Patents Pending.
Page 3of12
FIG. 8E

Roof Facet G- selected fisheye views

The fisheye views allow you to see what trees or structures may be casting shadow to each section of the roof. The sun's path is marked in the views by the yellow grid. A full selection of views is available on the website for each square foot of each facet.

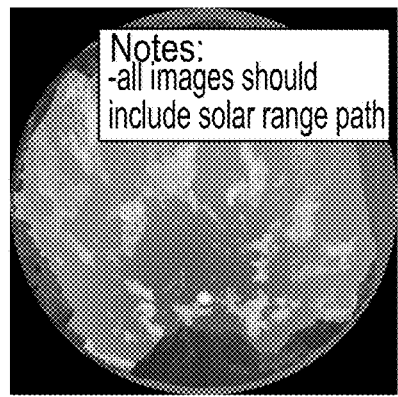

Notes:
-all images should include solar range path

View from facet G, grid square 6

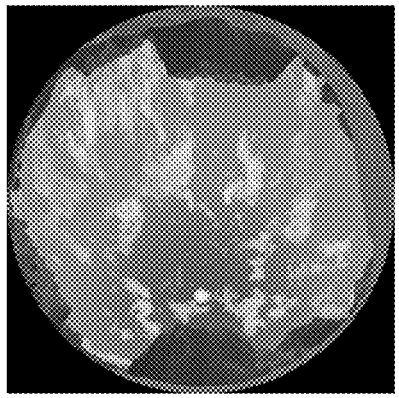

View from facet G, grid square 23

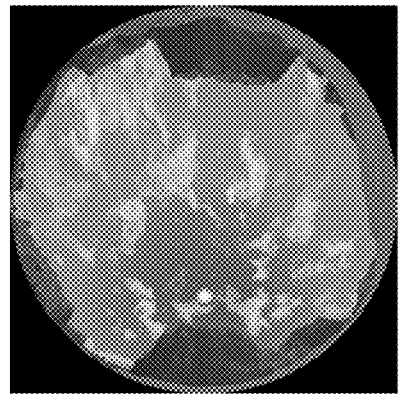

View from facet G, grid square 48

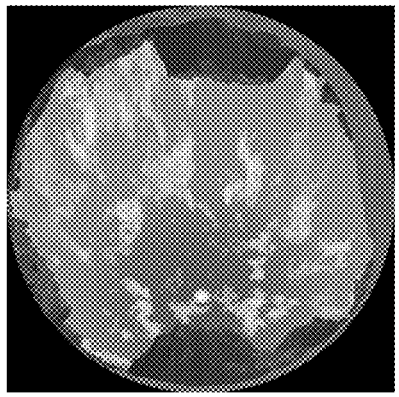

View from facet G, grid square 131

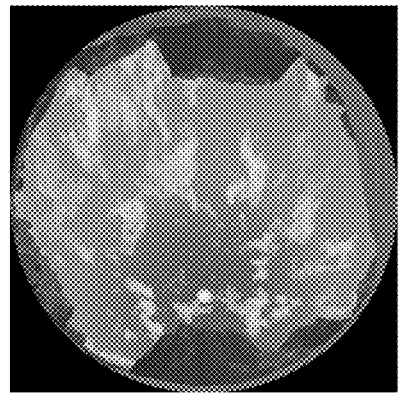

View from facet G, grid square 138

SunSite Complete™ Report
For 26 Jerusalem Ave, Hempstead, NY 1155-6046
Report : 12345678

 EAGLE VIEW®
July 11, 2018

Copyright © 2008-2018 EagleView Technologies.Inc. - All Rights Reserved- Covered by U.S. Patent Nos.8,078,436; 8,145,578; 8,170,840; 8,209,152; 8,515,125. Other Patents Pending

FIG. 8F

Imagery

These are Images of the property taken from multiple angles.

Top View

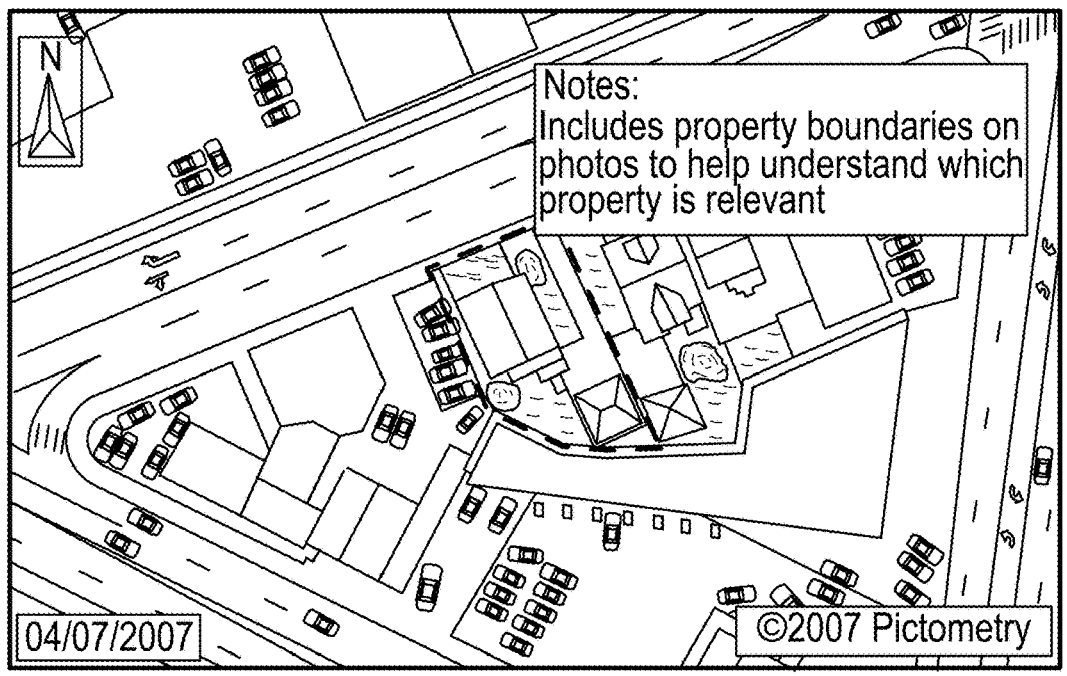

Notes:
Includes property boundaries on photos to help understand which property is relevant 04/07/2007      ©2007 Pictometry

SunSite Complete™ Report   EAGLE VIEW®

For 26 Jerusalem Ave, Hempstead, NY 1155-6046      July 11, 2018
Report: 12345678

Copyright © 2008-2018 EagleView Technologies, Inc. - All Rights Reserved - Covered by U.S. Patent Nos. 8,078,436; 8,145,578; 8,170,840; 8,209,152; 8,515,125. Other Patents Pending.

FIG. 8I

East Side
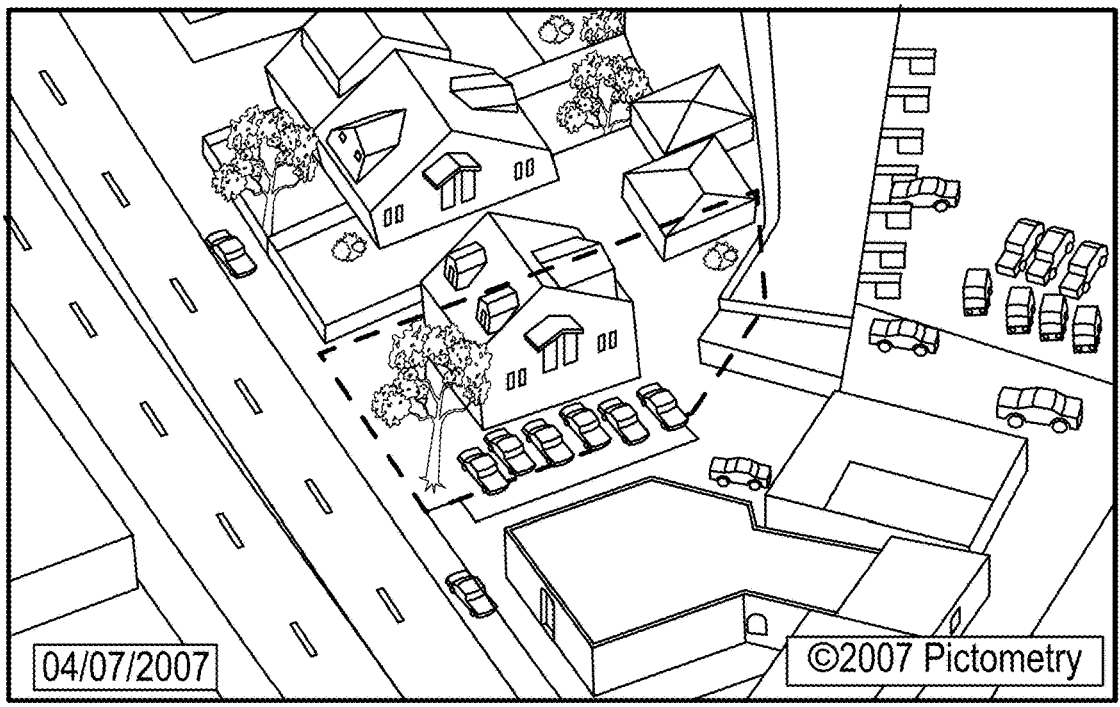
04/07/2007　　　©2007 Pictometry
SunSite Complete™ Report　　　 EAGLE VIEW®
For 26 Jerusalem Ave, Hempstead, NY 1155-6046　　July 11, 2018
Report: 12345678
Copyright © 2008-2018 EagleView Technologies, Inc. - All Rights Reserved - Covered by U.S. Patent Nos. 8, 078,436; 8,145,578; 8, 170,840; 8,209, 152; 8,515, 125. Other Patents Pending.
Page 10 of 12
FIG. 8L

West Side
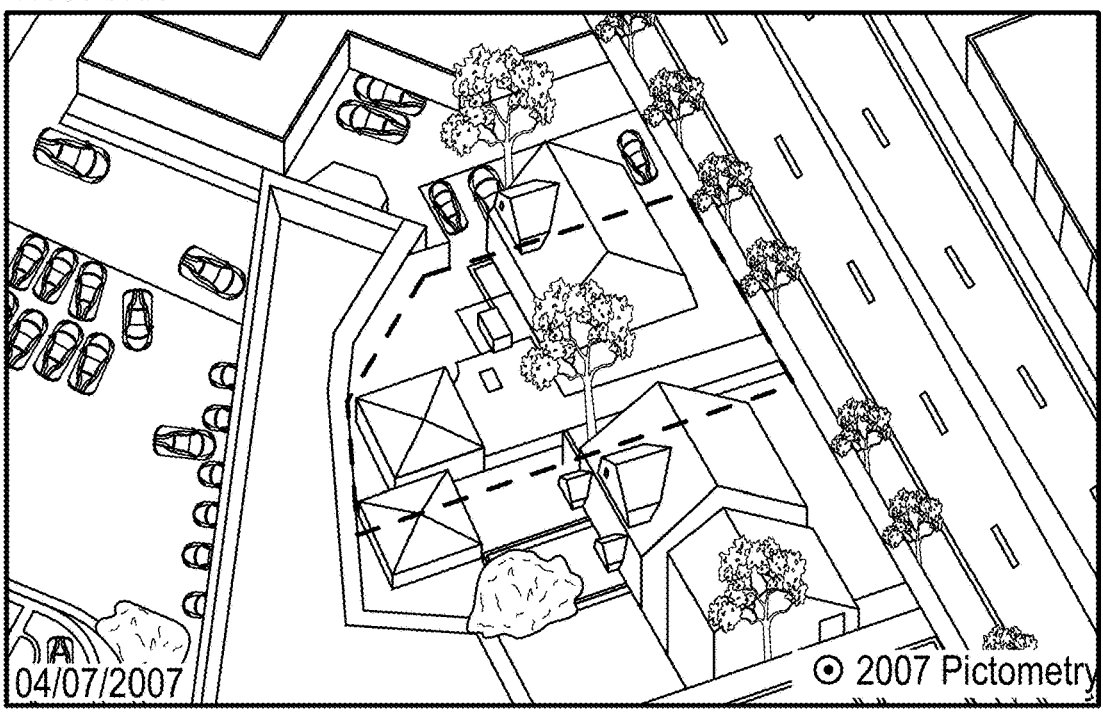
04/07/2007  © 2007 Pictometry
SunSite Complete™ Report  
For 26 Jerusalem Ave, Hempstead, NY 1155-6046   July 11, 2018
Report: 12345678
Copyright © 2008-2018 EagleView Technologies, Inc. - All Rights Reserved - Covered by U.S. Patent Nos. 8, 078,436; 8,145,578; 8, 170,840; 8,209, 152; 8,515, 125. Other Patents Pending.
Page 11 of 12
FIG. 8M

METHOD AND SYSTEM FOR DETERMINING SOLAR ACCESS OF A STRUCTURE

CROSS-REFERENCE TO RELATED APPLICATIONS

The present patent application is a continuation of and claims priority to U.S. Ser. No. 18/151,245, filed on Jan. 6, 2023, which is a continuation of and claims priority to U.S. Ser. No. 16/579,436, filed on Sep. 23, 2019, which issued as U.S. Pat. No. 11,551,413, which claims priority to provisional patent application U.S. Ser. No. 62/734,759, filed on Sep. 21, 2018, entitled "Method and System for Determining Solar Access of a Structure", the entire contents of each of which are hereby incorporated herein by reference.

BACKGROUND

There is a constant need for energy to power the growing energy consumption needs of modern society. At present, fossil fuels are the main source of this energy, but factors such as fossil fuel scarcity, resultant pollution from burning fossil fuels, and geopolitical factors that affect the price and availability of fossil fuels have resulted in a need for alternative sources of energy. An example of a popular form of an alternative energy source is solar energy.

In order to utilize solar energy, solar energy systems have been created and designed to harness received solar radiation into thermal or electrical energy through various means. These solar energy systems typically include a solar energy collector to collect the solar radiation and other components that may convert the collected solar radiation into either electrical or thermal energy.

These solar energy systems usually need to be designed and installed in locations and orientations with a significant or high solar radiation exposure in order to maximize the amount of solar radiation that may be collected by the solar energy systems. As a result, there is a need to measure the solar radiation access at a given location and orientation.

A number of systems that measure solar radiation may have limitations in their ease of use and accuracy. Some of the systems utilize chemical processes of film exposure to store captured images that may not be analyzed until the film is developed. Many have alignment problems that make it difficult to make accurate measurements. Further, devices may have limitations that include the lack of image calibration, the need to determine coordinates that uniquely identify the location of the device on the earth or region, the need to remain on-site for a long period of time, an inability to identify the skyline and open sky, and/or an inability to account for shading. In addition, the devices may be expensive to manufacture and/or use.

For example, the Solimetric SunEye and Wiley Electronics ASSET are specialized electronic devices that provide shade analysis by placing sensors on the site of a property to be measured. The Solar Pathfinder is a non-electronic device that requires placement on-site, and hand-tracing of a panoramic image reflected on a transparent dome on a paper template, and further processing of the result using a companion software package. In addition to high cost, many existing approaches and tools may require training and careful application, may require extra coordination, such as keeping the device level with a compass arrow correctly aligned while attempting to press a button to take a picture, and may be difficult to use in actual field conditions such as on a sloped roof and in bright sun. In addition, the use of these instruments may present a risk to the user due to the requirement for proper placement on roofs and other high surfaces.

Software systems exist that provide automated tools that permit the user to create a 3D model of a house, and manually apply 3D models of trees or other obstructions adjacent to the 3D model of the house. Then, the software conducts an automated analysis of the 3D model to determine shade, slope, and orientation values for estimating solar access values for individual points on the rooftop. One software system sold by Aurora Solar Inc., of San Francisco, California, allows the user to manually apply simulated 3D models of trees, and request LIDAR data to be displayed around the house, so that the height of the 3D models of the trees can be manually adjusted.

The previous software systems require manual creation of the 3D model of the roof. For shade analysis, the previous software systems require manual placement of simulated obstructions around the roof as part of the workflow in creating solar access values.

SUMMARY

Methods and systems for automatically determining solar access values are disclosed, including a system for determining solar access of a structure, comprising a computer system having a processor; and, one or more non-transitory computer readable medium accessible by the computer system and storing instructions that when executed by the processor of the computer system cause the processor to receive location information indicative of location of a structure; retrieve and/or receive a three-dimensional geo-referenced model of at least a part of the structure based at least in part on the location information, wherein geographic location on the earth of points in the three-dimensional geo-referenced model are stored or associated with points in the three-dimensional geo-referenced model; retrieve and/or receive object point cloud data indicative of one or more objects that cast shade on the structure based at least in part on the location information, wherein the object point cloud data is generated from one or more georeferenced images and the object point cloud data is indicative of an actual size, shape, and location of the one or more objects on the earth; divide the structure in the three-dimensional geo-referenced model of the structure into one or more sections; divide the sections into one or more areas, each area having at least three vertices; and determine, automatically, a solar access value for each of the vertices.

In one implementation, the one or more non-transitory computer readable medium may further store instructions that when executed by the processor of the computer system cause the processor to generate one or more three-dimensional geo-referenced object models of the one or more objects using the object point cloud data.

In one implementation, the step of determining, automatically, the solar access value, may comprise determining, automatically, Raw Irradiance for one or more of the sections by calculating nominal beam and diffuse irradiance incident on the section based on sun angle, orientation of the section, and weather data, for a given time and location of the section; and determining, automatically, refined irradiance for one or more of the vertices of the areas of the sections of the structure, based on the Raw Irradiance and calculating a ray between a sun position and a particular vertex of the one or more vertices as affected by the location of the object point cloud data in relation to a path of the ray.

In one implementation, the step of calculating the ray between the sun position and the particular vertex of the one or more vertices as affected by the location of the object point cloud data in relation to the path of the ray, may be based at least in part on a latitude and longitude of the particular vertex and information from a solar radiation database.

In one implementation, determining, automatically, refined irradiance may further comprise modeling interaction of the ray with the object point cloud data to determine an effect on Raw Irradiance by the one or more objects that cast shade on the structure.

In one implementation, the one or more non-transitory computer readable medium may further store instructions that when executed by the processor of the computer system cause the processor to generate one or more three-dimensional geo-referenced object models of the one or more objects using the object point cloud data.

In one implementation, the one or more non-transitory computer readable medium may further store instructions that when executed by the processor of the computer system cause the processor to generate one or more report indicative of a solar access value for one or more of the vertices of the structure and/or of areas of the structure.

In one implementation, a system for determining solar access of a structure may comprise a computer system having a processor; and, one or more non-transitory computer readable medium accessible by the computer system and storing instructions that when executed by the processor of the computer system cause the processor to: receive location information indicative of location of a structure; retrieve a three-dimensional geo-referenced model of at least a part of the structure based at least in part on the location information, wherein geographic location on the earth of points in the three-dimensional geo-referenced model are stored or associated with points in the three-dimensional geo-referenced model; retrieve and/or receive three dimensional object data indicative of one or more objects that cast shade on the structure, based at least in part on the location information, wherein the three dimensional object data is generated from one or more georeferenced images and the three dimensional object data is indicative of an actual size, shape, and location of the one or more objects on the earth; divide the structure in the three-dimensional geo-referenced model of the structure into one or more sections; divide the sections into one or more areas, each area having at least three vertices; and determine, automatically, a solar access value for the particular vertex based on refined irradiance.

In one implementation, a method for determining solar access may comprise receiving location information indicative of location of a structure; retrieving and/or receiving a three-dimensional geo-referenced model of at least a part of the structure based at least in part on the location information, wherein geographic location on the earth of points in the three-dimensional geo-referenced model are stored or associated with points in the three-dimensional geo-referenced model; retrieving and/or receiving object point cloud data indicative of one or more objects that cast shade on the structure based at least in part on the location information, wherein the object point cloud data is generated from one or more georeferenced images and the object point cloud data is indicative of an actual size, shape, and location of the one or more objects on the earth; dividing the structure in the three-dimensional geo-referenced model of the structure into one or more sections; dividing the sections into one or more areas, each area having at least three vertices; and determining, automatically, a solar access value for each of the vertices.

BRIEF DESCRIPTION OF THE SEVERAL VIEWS OF THE DRAWINGS

To assist those of ordinary skill in the relevant art in making and using the subject matter hereof, reference is made to the appended drawings, which are not intended to be drawn to scale, and in which like reference numerals are intended to refer to similar elements for consistency. For purposes of clarity, not every component may be labeled in every drawing.

FIGS. 8A-8M illustrate an exemplary report of results from an embodiment of the system in accordance with the present disclosure.

DETAILED DESCRIPTION

Figure 1:
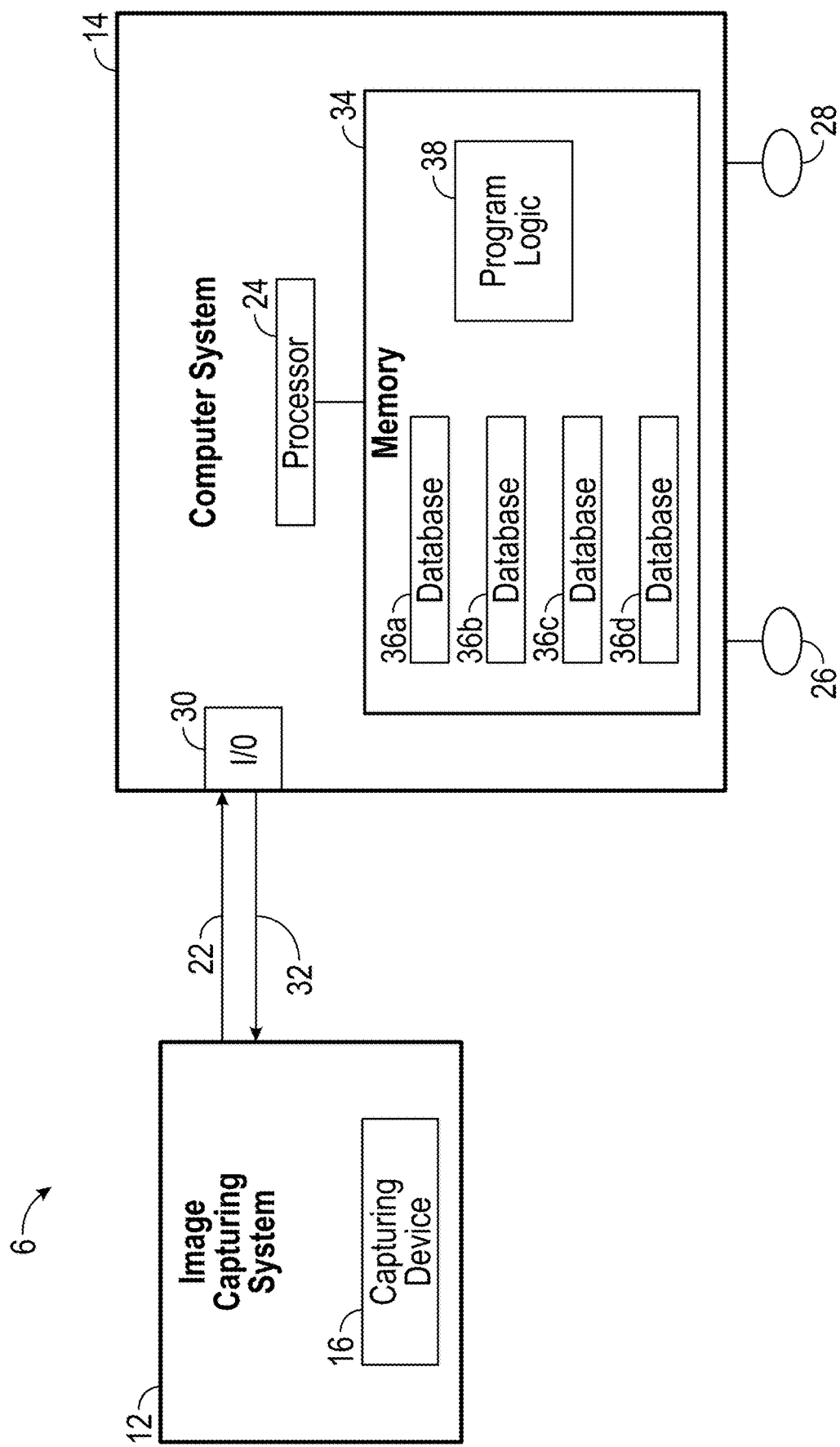
FIG. 1 illustrates a schematic diagram of hardware forming an exemplary embodiment of a system for automatically generating a solar access map for a structure. The system includes an image capturing system and a computer system.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. Also, it is to be understood that the phraseology and terminology employed herein is for purposes of description, and should not be regarded as limiting.

The following detailed description refers to the accompanying drawings. The same reference numbers in different drawings may identify the same or similar elements.

Definitions

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements, but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, any reference to "one embodiment," "an embodiment," "some embodiments," "one example," "for example," or "an example" means that a particular element, feature, structure or characteristic described in connection with the embodiment is included in at least one embodiment. The appearance of the phrase "in some embodiments" or "one example" in various places in the specification is not necessarily all referring to the same embodiment, for example.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), field programmable gate array (FPGA), a combination of hardware and software, and/or the like. The term "processor" as used herein means a single processor or multiple processors working independently or together to collectively perform a task.

Software may include one or more computer readable instructions that when executed by one or more components cause the component to perform a specified function. It should be understood that the algorithms described herein may be stored on one or more non-transient memory. Exemplary non-transient memory may include random access memory, read only memory, flash memory, and/or the like. Such non-transient memory may be electrically based, optically based, and/or the like.

It is to be further understood that, as used herein, the term "user" is not limited to a human being, and may comprise a computer, a server, a website, a processor, a network interface, a human, a user terminal, a virtual computer, combinations thereof, and the like, for example.

Global Horizontal Irradiance (GHI) is a total amount of solar radiation received from above by a surface horizontal to the ground. This value is of particular interest to photovoltaic installations and includes both Direct Normal Irradiance (DNI) and Diffuse Horizontal Irradiance (DHI) and may include Incident ground-reflected irradiance.

Diffuse Horizontal Irradiance (DHI) is the terrestrial irradiance received by a horizontal surface which has been scattered or diffused by the atmosphere. If diffuse horizontal irradiance is not measured directly, it may be calculated in a fashion similar to global horizontal irradiance.

Direct Normal Irradiance (DNI) is the amount of solar radiation received per unit area by a surface that is always held perpendicular (or normal) to the rays that come in a straight line from the direction of the sun at its current position in the sky.

Albedo is a ratio of incident ground-reflected irradiance to diffuse horizontal irradiance.

Incident ground-reflected irradiance is solar energy that reaches an array surface after reflecting from the ground.

Solar irradiance is a measure of the instantaneous power from the sun on a surface over an area, typically given in the units of watts per square meter.

Insolation is measurement of the energy from the sun over a given period of time on a surface typically given in watt hours per square meter.

Incident beam irradiance is a measurement of the energy from the sun that reaches a surface in a straight line from the sun.

DESCRIPTION

Referring now to the Figures, and in particular to FIG. 1, shown therein is a schematic diagram of hardware forming an exemplary embodiment of an apparatus 6 for automatically generating a solar resource assessment report for at least a portion of a roof 8 (see FIG. 2) of a structure 10 in accordance with the present disclosure. The solar resource assessment report may include determining a shade impact for various areas of the roof 8. Solar resource assessment can be used for placement and/or financial assessment for the deployment of photovoltaic shingles and panels. In general, the apparatus 6 calculates solar entitlement for a given region, and given time period, in which local weather, latitude, and altitude may be taken into consideration. The given region may be a portion of the Earth, or a portion of the structure 10. In the examples described herein, the given region is a roof section of the roof 8 of the structure 10. It should be understood that the methods and systems described herein can be used for determining solar entitlement and solar access for a portion of the Earth, or another portion of the structure 10, such as a wall of the structure 10. In any event, once the solar entitlement is calculated, then, shading impact to the roof 8 of the structure 10 during subperiods of the given time period from obstructions in the path of radiation from the sun 11 may be calculated and accumulated to generate the solar access for the given region.

Shading can be categorized as either horizon shading or local shading. Horizon shading may affect relatively large sections of the roof 8, and local shading may affect relatively smaller sections of the roof 8. The sources of horizon shading are typically other buildings and trees that are positioned away from the roof 8, but between the sun 11 and the roof 8 at particular instants of time as the sun 11 moves in a path across the horizon throughout the year. Local shading are typically trees placed adjacent to the roof 8, or parts of the roof 8, such as structural components of the roof 8 that shade other components of the roof 8, such as dormers, or structural parts of the structure 10, such as an exterior wall, or a chimney.

Optionally, solar resource assessments for a particular application of photovoltaic array (e.g., photovoltaic shingles, or photovoltaic cells) can also be calculated. In this case, a given technology, mounting method, and orientation of the particular application can be used as inputs for the calculation.

Generally, the structure 10 is a man-made structure, such as a residential building, commercial building, awning, or carport. However, it will be understood that the structure 10 may be a hill or other natural structure.

In some embodiments, the apparatus 6 may include an image capturing system 12 and one or more computer systems 14. Alternatively, the apparatus 6 may solely include one or more computer systems 14, with the apparatus 6 obtaining one or more images from a third-party system. To that end, in some embodiments, the image capturing system 12 may obtain one or more images, in addition to the one or more images obtained from the third-party system.

In some embodiments, the image capturing system 12 may include one or more capturing devices 16 collecting one or more images of an exterior of the structure 10. For example, the image capturing system 12 may include one or more capturing devices 16 collecting one or more aerial images of the roof 8 and/or walls of the structure 10.

The capturing device 16 may be capable of capturing images photographically and/or electronically. The capturing device 16 may electronically capture digital images having pixels. The capturing device 16 may include known or determinable characteristics including, but not limited to, focal length, sensor size, aspect ratio, radial and other distortion terms, principal point offset, pixel pitch, alignment, and/or the like.

In some embodiments, the capturing device 16 of the image capturing system 12 may include, but is not limited to, one or more conventional cameras, digital cameras, digital sensors, charge-coupled devices, and/or the like. For example, in one example, the capturing device 16 may be one or more cameras captured with the aid of an aircraft, such as an airplane, or an unmanned aerial system. Suitable image capture systems are described in U.S. Pat. No. 7,424,133, entitled "METHOD AND APPARATUS FOR CAPTURING, GEOLOCATING AND MEASURING OBLIQUE IMAGES"; U.S. Pat. No. 8,520,079, entitled "EVENT MULTIPLEXER FOR MANAGING THE CAPTURE OF IMAGES"; and U.S. Pat. No. 9,612,598, entitled "UNMANNED AIRCRAFT STRUCTURE EVALUATION SYSTEM AND METHOD"; the entire contents of each of which are hereby incorporated herein by reference. The images captured by the image capture system 12 can be oblique images, orthogonal images (also known as nadir images), or combinations thereof.

The capturing device 16 may acquire one or more images and issue one or more image data signals (IDS) 22 corresponding to one or more particular images and/or photographs acquired. One or more images may be stored in the computer system 14. In addition, the image capturing system 12 may further include a positioning and orientation device, such as a GPS and/or, an inertial measurement unit, which collects data indicative of a three-dimensional location of the sensor of the capturing device 16, an orientation of the sensor, as well as compass direction of the sensor each time the images and/or photographs are acquired.

The images may be geo-referenced to produce geo-referenced images or may be provided as geo-referenced images. In some embodiments, geo-referenced images may be provided using techniques described in U.S. Pat. No. 7,424,133, which is hereby incorporated by reference in its entirety. Geo-referenced images may be images having stored geo-referenced parameters. Geo-referenced images may provide a location in real world coordinates, such as latitude/longitude, of pixels in the geo-referenced image using solely that image, or an overlapping image.

Referring to FIG. 1, the computer system 14 may be a system or systems that are able to embody and/or execute the logic of the processes described herein. Logic embodied in the form of software instructions and/or firmware may be executed on any appropriate hardware. For example, logic embodied in the form of software instructions or firmware may be executed on a dedicated system or systems, or on a personal computer system, or on a distributed processing computer system, and/or the like. In some embodiments, logic may be implemented in a stand-alone environment operating on a single computer system and/or logic may be implemented in a networked environment, such as a distributed system using multiple computers and/or processors.

In some embodiments, the computer system 14 may include one or more processors 24 communicating with one or more input devices 26, output devices 28, and/or I/O ports 30 enabling the input and/or output of data to and from the computer system 14 to the image capturing system 12 and/or a user.

The one or more input devices 26 may be capable of receiving information input from a user, and/or one or more processors, and transmitting such information to the processor 24. The one or more input devices 26 may include, but are not limited to, implementation as a keyboard, touchscreen, mouse, trackball, microphone, fingerprint reader, infrared port, slide-out keyboard, flip-out keyboard, cell phone, PDA, video game controller, remote control, fax machine, network interface, speech recognition, gesture recognition, eye tracking, brain-computer interface, combinations thereof, and/or the like.

The one or more output devices 28 may be capable of outputting information in a form perceivable by a user and/or processor(s). For example, the one or more output devices 28 may include, but are not limited to, implementations as a computer monitor, a screen, a touchscreen, a speaker, a website, a television set, a smart phone, a PDA, a cell phone, a fax machine, a printer, a laptop computer, an optical head-mounted display (OHMD), combinations thereof, and/or the like. It is to be understood that in some exemplary embodiments, the one or more input devices 26 and the one or more output devices 28 may be implemented as a single device, such as, for example, a touchscreen or a tablet.

In some embodiments, output of information in a form perceivable by a user and/or processor may comprise displaying or providing for display a webpage (e.g., webpage having one or more images and software indicative of a solar access report discussed in more detail herein), electronic communications, e-mail, and/or electronic correspondence to one or more user terminals interfacing with a computer and/or computer network(s) and/or allowing the one or more users to participate, such as by interacting with one or more mechanisms on a webpage, electronic communications, e-mail, and/or electronic correspondence by sending and/or receiving signals (e.g., digital, optical, and/or the like) via a computer network interface (e.g., Ethernet port, TCP/IP port, optical port, cable modem, combinations thereof, and/or the like). A user may be provided with a web page in a web browser, or in a software application, for example.

The image data signals 22 may be provided to the computer system 14. For example, the image data signals 22 may be received by the computer system 14 via the I/O port 30. The I/O port 30 may comprise one or more physical and/or virtual ports.

In some embodiments, the computer system 14 may issue an image capturing signal 32 to the image capturing system 12 to thereby cause the capturing device 16 to acquire and/or capture an image at a predetermined location and/or at a predetermined interval.

The computer system 14 may include one or more processors 24 working together, or independently to execute processor executable code, and one or more memories 34 capable of storing processor executable code. In some embodiments, each element of the computer system 14 may be partially or completely network-based or cloud-based, and may or may not be located in a single physical location.

The one or more processors 24 may be implemented as a single or plurality of processors working together, or independently, to execute the logic as described herein. Exemplary embodiments of the one or more processors 24 may include, but are not limited to, a digital signal processor (DSP), a central processing unit (CPU), a field programmable gate array (FPGA), a microprocessor, a multi-core processor, and/or combination thereof, for example. The one or more processors 24 may be capable of communicating via a network (e.g., analog, digital, optical, and/or the like) via one or more ports (e.g., physical or virtual ports) using a network protocol. It is to be understood, that in certain embodiments, using more than one processor 24, the processors 24 may be located remotely from one another, in the same location, or comprising a unitary multi-core processor. The one or more processors 24 may be capable of reading and/or executing processor executable code and/or capable of creating, manipulating, retrieving, altering, and/or storing data structures into one or more memories 34.

The one or more memories 34 may be capable of storing processor executable code. Additionally, the one or more memories 34 may be implemented as a conventional non-transient memory, such as, for example, random access memory (RAM), a CD-ROM, a hard drive, a solid state drive, a flash drive, a memory card, a DVD-ROM, a floppy disk, an optical drive, combinations thereof, and/or the like, for example.

In some embodiments, the one or more memories 34 may be located in the same physical location as the computer system 14. Additionally, or alternatively, one or more memories 34 may be located in a different physical location as the computer system 14, with the computer system 14 communicating with one or more memories 34 via a network, for example. Additionally, or alternatively, one or more of the memories 34 may be implemented as a "cloud memory" (i.e., one or more memories 34 may be partially or completely based on or accessed using a network, for example).

Figure 4:
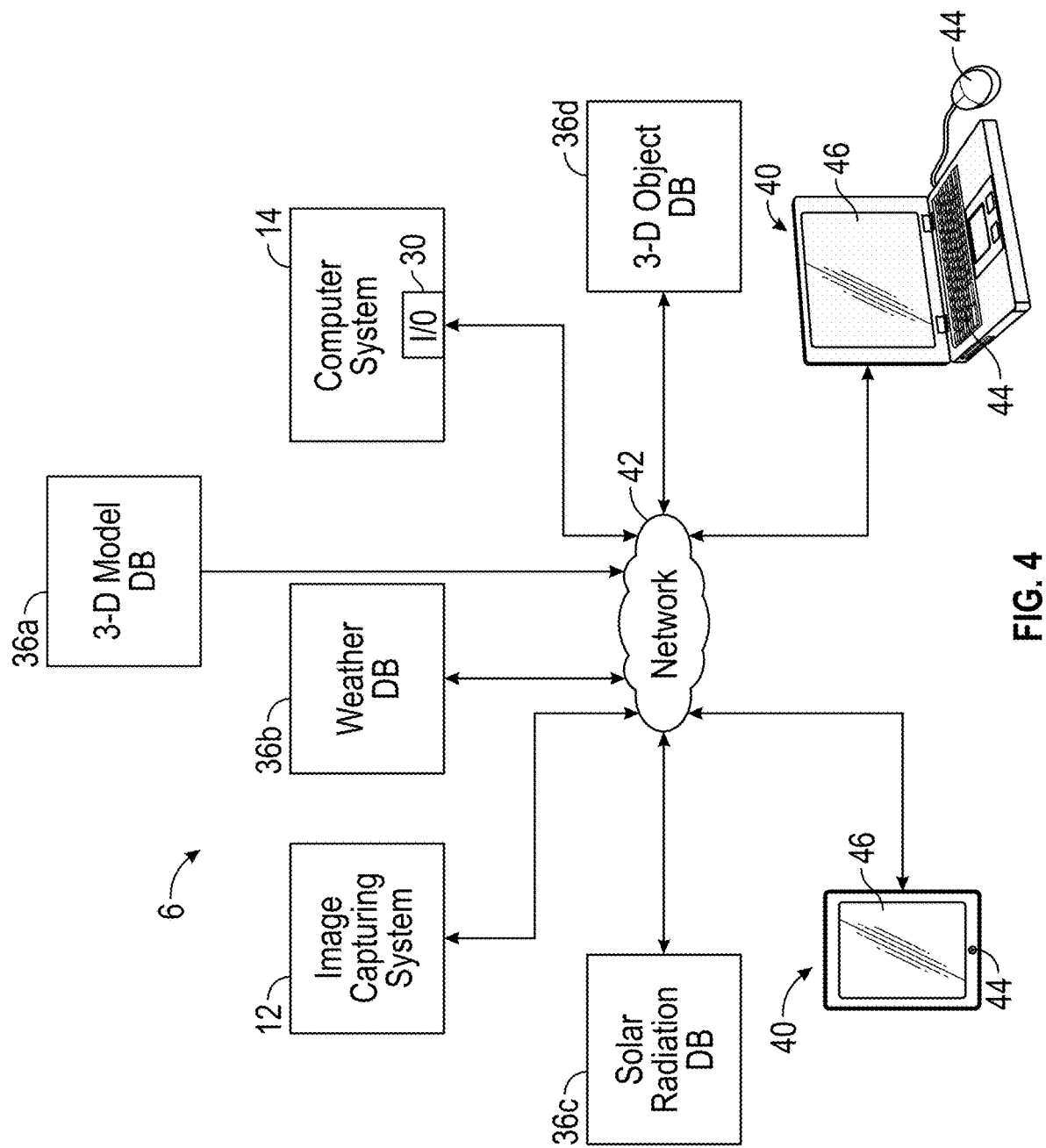
FIG. 4 is a schematic diagram of an exemplary embodiment of an apparatus in accordance with the present disclosure.

Referring to FIGS. 1 and 4, the one or more memories 34 may store processor executable code and/or information comprising one or more databases 36 and program logic 38. In this example, the one or more memories 34 may store one or more of a 3D Model database 36a, a weather database 36b, a solar radiation database 36c, and a three dimensional object database 36d. The databases 36a-36d may be hosted by the computer system 14 (or hosted separately from the computer system 14). The 3D model database 36a may store data indicative of one or more of the following: a plurality of 3D models of the structures 10; corresponding geo-location data identifying the 3D models of the structures 10 within the 3D model database 36a; and data indicative of a three-dimensional location (on the Earth) of specific nodes on the 3D models.

The weather database 36b may store historical weather of regions where the structures 10 are located on the Earth. Exemplary historical weather data may be observations of weather by weather reporting instruments, including but not limited to, temperature, dew point, relative humidity, precipitation, wind speed and direction, visibility, atmospheric pressure, and types of weather such as hail, fog, and thunder. This data can be recorded, for example, on a sub-hourly basis, an hourly basis, daily basis, and/or a monthly basis.

Figure 5:
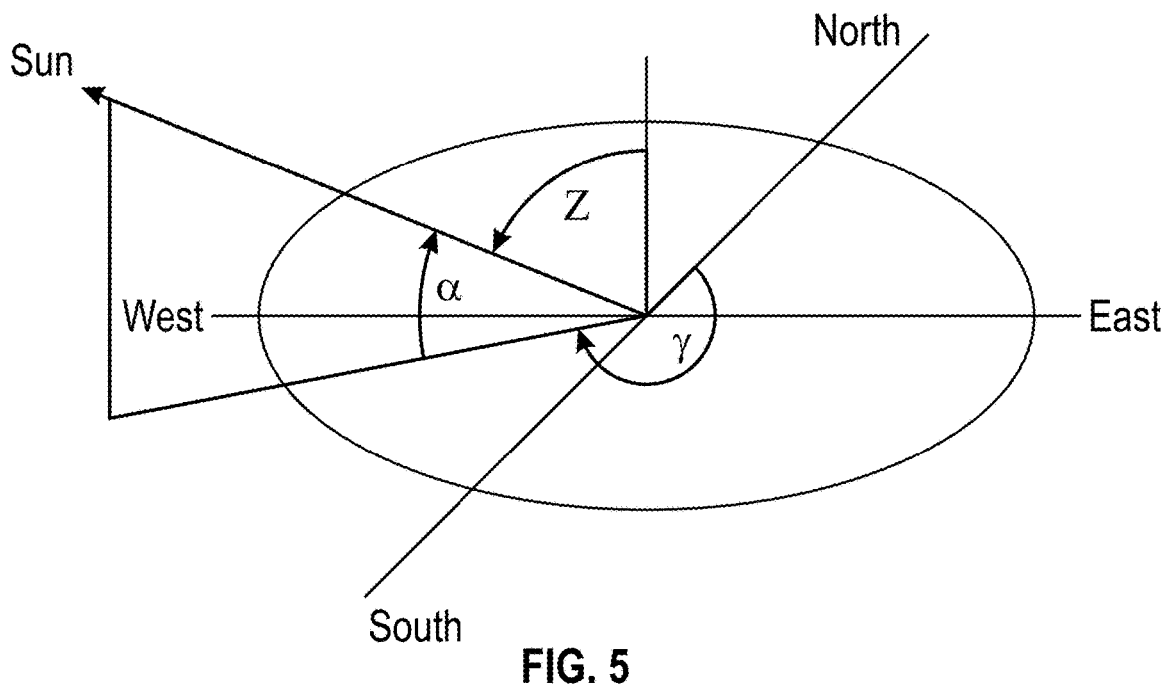
FIG. 5 is a diagram of angles of the sun relative to a point on the Earth in accordance with the present disclosure.

The solar radiation database 36c may store solar radiation data indicative of a location of the sun 11 relative to the Earth at particular instants of time. When queried with information indicative of time, date, and location on the Earth, the solar radiation database can return outputs such as Zg (Solar Zenith Angle in degrees), Z (Solar Zenith Angle in radians), Ag (Solar Azimuth Angle in degrees), A (Solar Azimuth Angle in radians), $\alpha$ (Solar Altitude angle in degrees), $\delta$ (Solar Declination Angle in degrees), $\gamma$ (Solar Azimuth Angle in degrees), sunup (Sun up over horizon (0/1)), sunrise (Time to sunrise (e.g., decimal hours)), sunset (Time to sunset (e.g., decimal hours)), cos($\alpha$) (Derivative cosine of zenith (e.g., decimal)), sin($\alpha$) (Derivate sine of zenith (e.g., decimal)), cos($\gamma$) (Derivative cosine of azimuth (e.g., decimal)), sin($\gamma$) (Derivate sine of azimuth (e.g., decimal)). FIG. 5 illustrates some of the angles of the sun 11 relative to a point on the Earth, including the Solar Zenith Angle (Z), the Solar Azimuth Angle ($\gamma$), and the Solar Altitude angle ($\alpha$).

The three-dimensional object database 36d may store information indicative of a size, shape, and location of three-dimensional structures to identify shade objects 56 which may cast shade on the structure 10 represented by the 3D model. The shade object(s) 56 may block at least a portion of irradiance from reaching the structure 10 for at least a portion of time, such as a portion of time during a predetermined range of time. In one embodiment, the three-dimensional object database 36d may include one or more point cloud of areas surrounding the 3D models of the structures 10.

Figure 2:
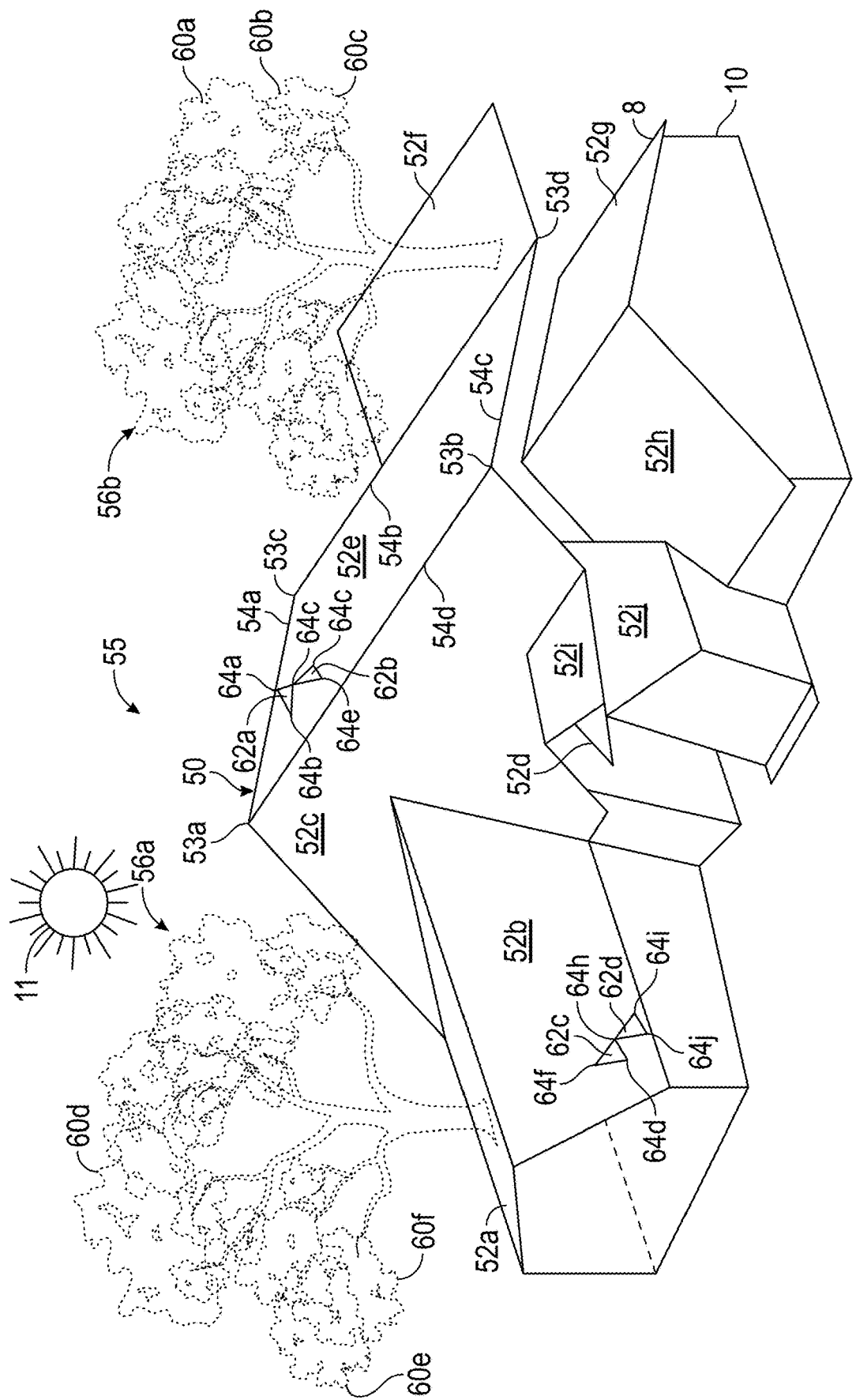
FIG. 2 illustrates an exemplary three-dimensional model and surrounding point clouds in accordance with the present disclosure.
Figure 7:
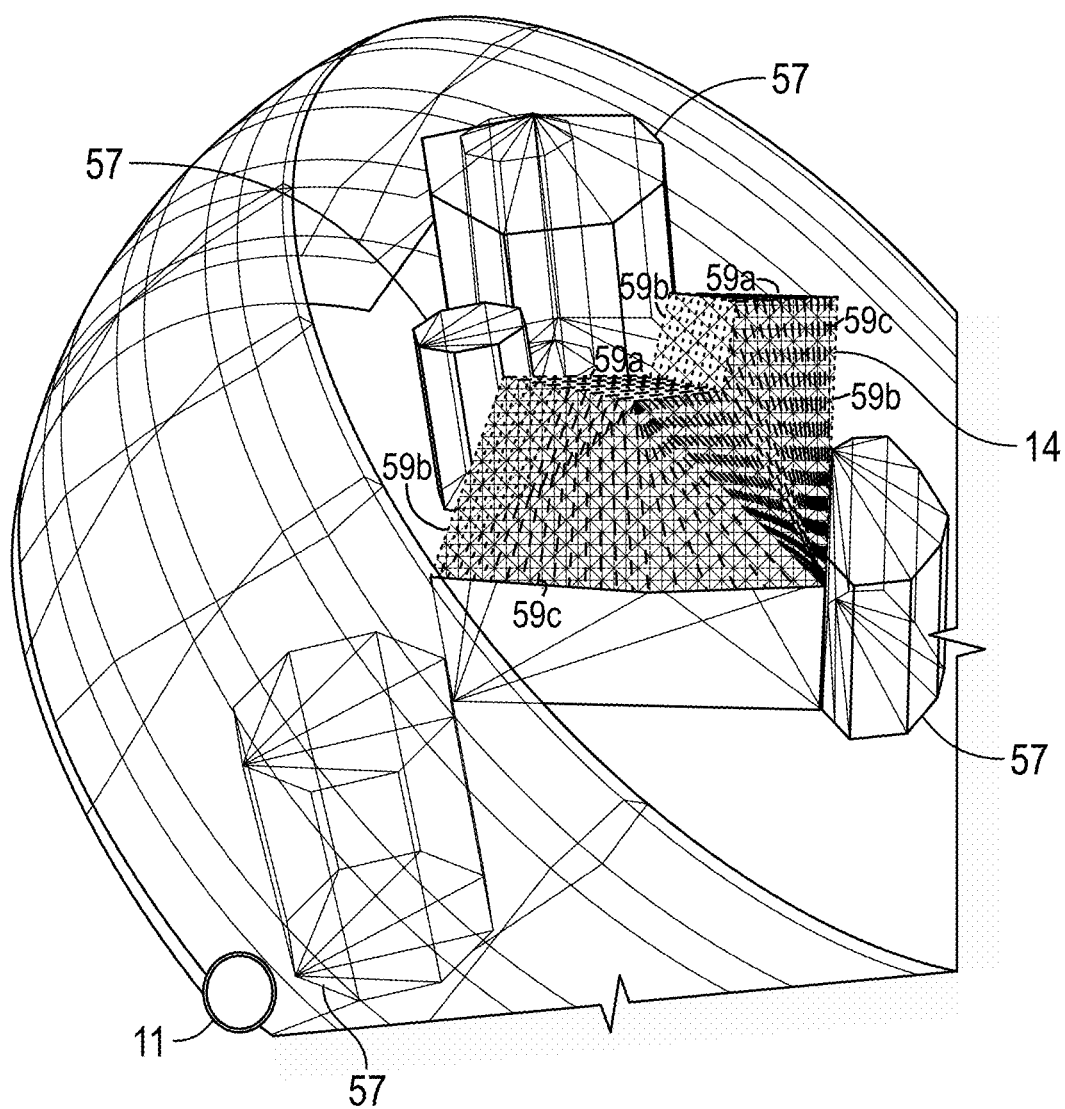
FIG. 7 is a diagrammatic view of a shadow tracing method in accordance with the present disclosure.

The point cloud data may be used to generate object models 57 of the areas and/or objects 56 surrounding the structures 10 (see FIGS. 2 and 7). The object models 57 may be stored in the three-dimensional object database 36d and used in the calculations set forth below to determine the shade impact on the Solar Access, for example. Information indicative of the size, shape, and location of the three-dimensional structures may be determined in a manner other than the use of the point cloud. For instance, an ortho image of a potential shade object 56 may be used to estimate a shape and size of a canopy of the shade object 56, and latitude/longitude information for the shade object 56. An oblique image may be used to determine a maximum height of the shade object 56. Because shade objects 56 may not be uniformly shaped (for example, a tree), information from the point cloud represents the size and shape of the shade object 56 more accurately, and therefore provides more accurate results in calculating the shade impact due to particular shade objects 56.

In one embodiment, the weather database 36b and the solar radiation database 36c are publicly available databases, such as those hosted by the National Renewable Energy Laboratory.

In some embodiments, as shown in FIG. 4, the computer system 14 and/or the image capturing system 12 of the apparatus 6 may be in communication with one or more additional processors 40. In this example, the computer system 14 may communicate with the one or more additional processors 40 via a network 42. As used herein, the terms "network-based", "cloud-based", and any variations thereof, may include the provision of configurable computational resources on demand via interfacing with a computer and/or computer network, with software and/or data at least partially located on the computer and/or computer network, by pooling processing power of two or more networked processors.

In some embodiments, the network 42 may be the Internet and/or other network. For example, if the network 42 is the Internet, a primary user interface of the image capturing software and/or image manipulation software may be delivered through a series of web pages. It should be noted that the primary user interface of the image capturing software and/or image manipulation software may be replaced by another type of interface, such as, for example, a Windows-based application.

The network 42 may be almost any type of network. For example, the network 42 may interface by optical and/or electronic interfaces, and/or may use a plurality of network topographies and/or protocols including, but not limited to, Ethernet, TCP/IP, circuit switched paths, and/or combinations thereof. For example, in some embodiments, the network 42 may be implemented as the World Wide Web (or Internet), a local area network (LAN), a wide area network (WAN), a metropolitan network, a wireless network, a cellular network, a Global System for Mobile Communications (GSM) network, a code division multiple access (CDMA) network, a 3G network, a 4G network, a 5G network, a satellite network, a radio network, an optical network, a cable network, a public switched telephone network, an Ethernet network, combinations thereof, and/or the like. Additionally, the network 42 may use a variety of network protocols to permit bi-directional interface and/or communication of data and/or information. It is conceivable that in the near future, embodiments of the present disclosure may use more advanced networking topologies.

The computer system 14 and image capturing system 12 may be capable of interfacing and/or communicating with the one or more computer systems including processors 40 via the network 42. Additionally, the one or more processors 40 may be capable of communicating with each other via the network 42. For example, the computer system 14 may be capable of interfacing by exchanging signals (e.g., analog, digital, optical, and/or the like) via one or more ports (e.g., physical ports or virtual ports) using a network protocol, for example.

The processors 40 may include, but are not limited to implementation as a variety of different types of computer systems, such as a server system having multiple servers in a configuration suitable to provide a commercial computer based business system (such as a commercial web-site), a personal computer, a smart phone, a network-capable television set, a television set-top box, a tablet, an e-book reader, a laptop computer, a desktop computer, a network-capable handheld device, a video game console, a server, a digital video recorder, a DVD player, a Blu-Ray player, a wearable computer, a ubiquitous computer, combinations thereof, and/or the like.

In some embodiments, the computer systems comprising the processors 40 may include one or more input devices 44, one or more output devices 46, processor executable code, and/or a web browser capable of accessing a website and/or communicating information and/or data over a network, such as network 42. The computer systems comprising the one or more processors 40 may include one or more non-transitory memory comprising processor executable code and/or software applications, for example. Exemplary non-transitory memory includes random access memory, flash memory, read only memory, and the like. The computer system 14 may be modified to communicate with any of these processors 40 and/or future developed devices capable of communicating with the computer system 14 via the network 42.

The one or more input devices 44 may be capable of receiving information input from a user, processors, and/or environment, and transmit such information to the processor 40 and/or the network 42. The one or more input devices 44 may include, but are not limited to, implementation as a keyboard, touchscreen, mouse, trackball, microphone, fingerprint reader, infrared port, slide-out keyboard, flip-out keyboard, cell phone, PDA, video game controller, remote control, fax machine, network interface, speech recognition, gesture recognition, eye tracking, brain-computer interface, combinations thereof, and/or the like.

The one or more output devices 46 may be capable of outputting information in a form perceivable by a user and/or processor(s). For example, the one or more output devices 46 may include, but are not limited to, implementations as a computer monitor, a screen, a touchscreen, a speaker, a website, a television set, a smart phone, a PDA, a cell phone, a fax machine, a printer, a laptop computer, an optical head-mounted display (OHMD), combinations thereof, and/or the like. It is to be understood that in some exemplary embodiments, the one or more input devices 44 and the one or more output devices 46 may be implemented as a single device, such as, for example, a touchscreen or a tablet.

Figure 3:
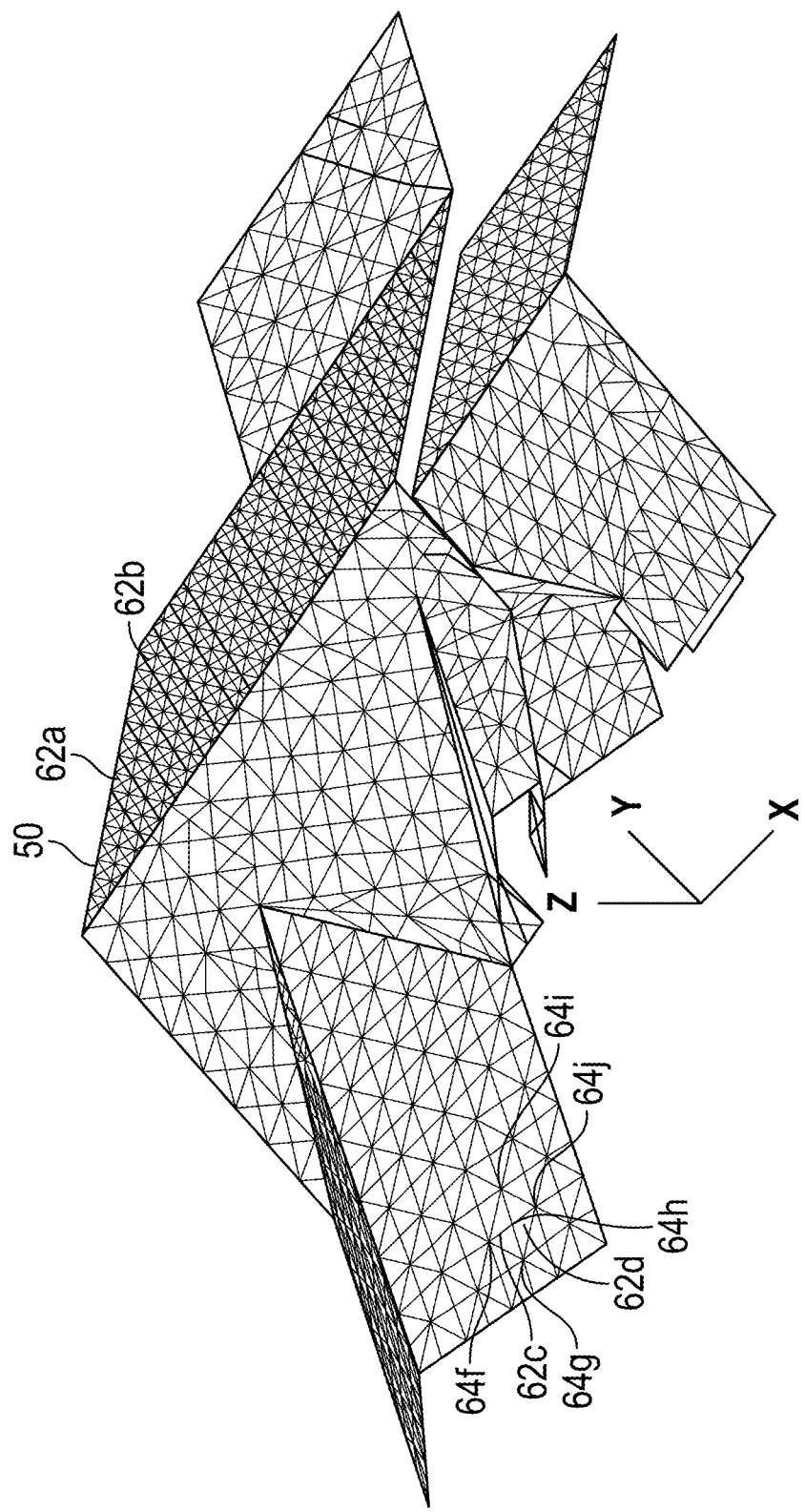
FIG. 3 illustrates an exemplary three-dimensional model in which the roof has been segmented in accordance with the present disclosure.

Referring to FIGS. 1 and 3, in use, the computer system 14 may execute the program logic 38 controlling the reading, manipulation of the images into a point cloud, and/or storing of the image data signal(s) 22 and/or point cloud. For example, the program logic 38 may read the image data signals 22, and may store the images within the one or more memories 34.

In some embodiments, the location, orientation, and/or compass direction of the one or more capturing devices 16 relative to the Earth at the precise moment each image is captured may be recorded within the one or more memories 34. Location data may be associated with the corresponding captured image. Such location data may be included within the image data signals 22 and used to create the 3D point cloud. In one embodiment, location data may be determined from the corresponding captured image using techniques described in U.S. Pat. No. 7,424,133. However, it will be understood that other techniques may be used to determine the location data from the captured images.

The one or more processors 24 may create and/or store in the one or more memories 34, one or more output image and data files. For example, the processor 24 may convert image data signals 22 into computer-readable output image, data files, and/or the 3D point cloud. The output image, data files, and/or 3D point cloud may include a plurality of captured image files corresponding to captured images, positional data, and/or 3D point clouds created from analyzing the images. Systems and methods for creating the 3D point clouds from the output images and data files is found in U.S. Pat. No. 10,402,676, entitled "AUTOMATED SYSTEM AND METHODOLOGY FOR FEATURE EXTRACTION", the entire content of which is hereby incorporated herein by reference.

Referring to FIG. 2, an exemplary 3D model 50 representing the structure 10, including the roof 8 of the structure 10, is shown. Methods and systems to create the 3D model of the roof 8 can be found in U.S. Pat. Nos. 8,078,436; 8,977,520; 8,170,840; 8,209,152; and U.S. Patent Application Publication No. 2019/0188337 A1, the entire content of each of which is hereby incorporated herein by reference.

As shown in FIG. 2, the 3D model 50 of the roof 8 includes a plurality of roof sections 52a-52j. In some embodiments, such as when the roof 8 is a flat roof, or a shed style roof, or a roof with a single plane, the roof 8 may only have one roof section 52. The roof sections 52a-52j may be planar polygons that have a corresponding slope, area, edges, and orientation with respect to the sun. In one embodiment, the roof sections 52 may be triangular shaped.

The roof sections 52a-52j have a plurality of nodes 53. For purposes of clarity, only four of the nodes 53 forming the roof section 52e are labeled in FIG. 2 with the reference numerals 53a-53d. The nodes 53a-53d are connected by edges 54a-54d. The three-dimensional position on the Earth of the nodes 53 are stored in, or otherwise correlated to, the 3D model 50 of the roof 8. In one embodiment, the nodes 53 may comprise one or more intersection or end point of the edge(s) 54 of the roof section(s) 52. The three-dimensional positions of the nodes 53 can be determined using ray-tracing techniques with a single geo-referenced image as disclosed, for example, in U.S. Pat. No. 7,424,133; aerotriangulation using two or more geo-referenced images, or stereoscopic photogrammetry techniques, and/or loading the information from one or more tables. The orientation and pitch of each of the roof sections 52 can be determined using the three-dimensional positions of the nodes 53.

Also shown in FIG. 2 is a portion of a 3D point cloud 55 showing three-dimensional positions on the Earth of two shade objects 56a and 56b which provide shade to the roof 8 of the structure 10 during periods of time during the year. The shade objects 56 can be any object which is positioned in a stationary location and that provides at least some to shade (that is, blocks at least some amount of irradiance from reaching) the roof 8 of the structure 10 during a period of time. Exemplary shade objects include a tree, a building, a bridge, an awning, a tower, and combinations thereof. In this example, the shade objects 56a and 56b are trees which can be either horizon shading or local shading depending upon location of the shade objects 56a and 56b relative to the roof 8 of the structure 10 and the sun 11.

The shade objects 56a and 56b are represented in the 3D point cloud 55 with a plurality of points 60. For purposes of clarity, only the points 60a-60f have been labeled in FIG. 2. The three-dimensional position of each of the points 60 are stored in the 3D point cloud 55, which may be stored in the three-dimensional object database 36d. The resolution of the 3D point cloud 55 obtained from aerial imagery varies with the ground sampling distance (GSD) of the imagery. In one embodiment, exemplary resolutions for the 3D point cloud 55 may be between 1.5 cm and 3 cm. In some embodiments, the size and shape of the shade objects 56a and 56b, as represented in the 3D point cloud 55 (and in the three-dimensional object database 36d), are different.

In one embodiment, the three-dimensional position of the points 60 of the shade object 56 may be used to create a geo-referenced 3D object model 57 of the shade object 56. The 3D point cloud 55 and the object models 57 show the real-world shape, size, and location of the objects 56 and the area surrounding the structure 10. The 3D object model 57 of the shade object 56 may be stored in the three-dimensional object database 36d and/or in other databases. Because the three-dimensional location of the object model 57 and each of the roof sections 52 are known the distance between the object model 57 and the roof sections 52 may be calculated and used to reduce the indirect irradiance when the direct ray beam is blocked (i.e., in shadow), to produce a precise calculation of actual solar irradiance.

As shown in FIGS. 2 and 3, the roof sections 52a-52j of the 3D model 50 are subdivided into a plurality of areas 62, with each area 62 bounded by at least three vertices 64. For purposes of clarity, only four of the areas 62 are shown and designated as areas 62a-62d. Again, for purposes of clarity only the vertices 64a-64j that surround and define the areas 62a-62d are shown in FIG. 2. The areas 62 may include a predefined maximum square area (measured in feet or meters, for example). In one embodiment, each of the areas 62 is one square foot. In FIG. 3, all of the areas 62 and vertices 64 are shown, but are not specifically labeled due to the large number of areas 62 and vertices 64. Though the areas 62 are shown having three vertices 64 forming a triangular shape, it will be understood that the areas 62 may have more vertices 64 and may form other polygon shapes.

The three-dimensional position on the Earth of the vertices 64 may be stored with the 3D model 50, or may be stored separately and correlated with the 3D model 50. The three-dimensional position of each of the nodes 53, points 60, and vertices 64 can be identified in any suitable format, such as cartesian coordinates (X, Y, and Z), or latitude, longitude and altitude. Altitude can be provided in any suitable format, such as relative to the ground, or to sea level.

Examples of the program logic 38 are discussed hereinafter. In one embodiment, the program logic 38 performs the following calculations on sub-periods within a selected period. For example, the selected period can be a day, week, month or year. The sub-periods are less than the selected period, and can be in seconds, minutes, hours, days, weeks, or months, for example. In the example discussed herein by way of example, the sub-periods are one hour, and the selected period is one year. It should be understood that other sub-periods and selected periods can be used.

For each roof section 52, the program logic 38 calculates a value referred to herein as "raw irradiance." The raw irradiance may be the nominal beam and diffuse irradiance incident on the plane of array (POA irradiance) based on sun angle, surface orientation, and weather information. The part of the program logic 38 for calculating the raw irradiance is referred to herein as an irradiance calculator.

Figure 6:
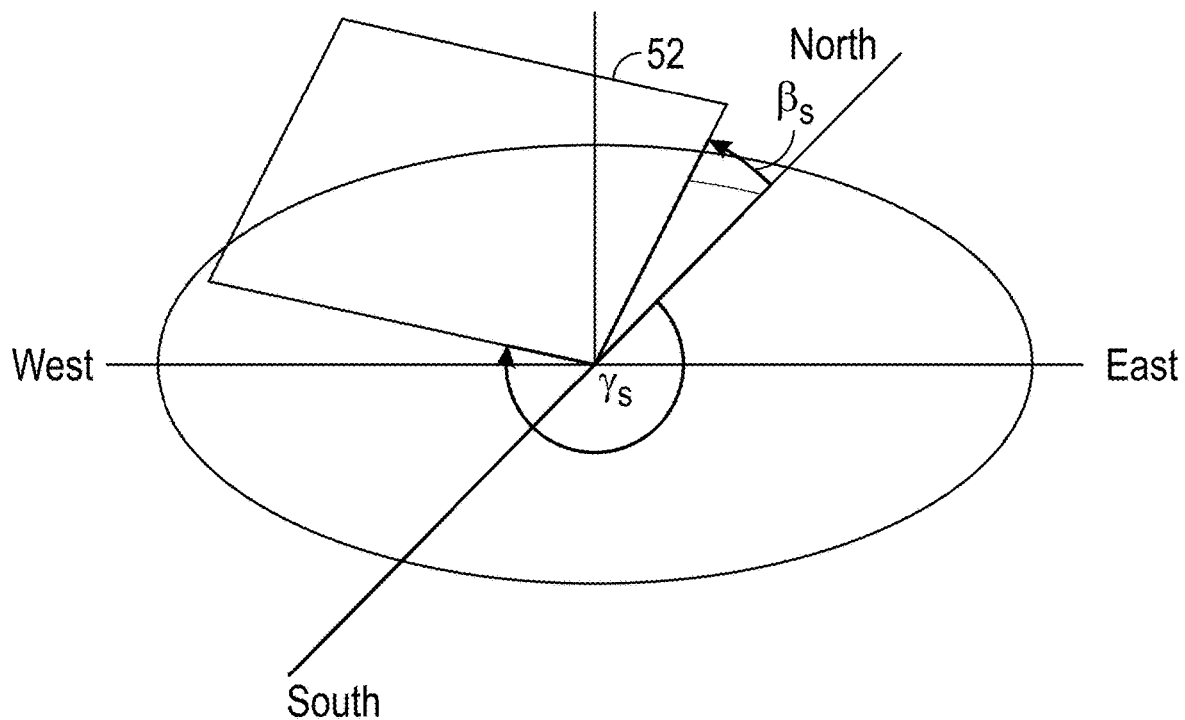
FIG. 6 is an illustration of a roof section in conjunction with the sun angle diagram of FIG. 5.

The raw irradiance for each roof section 52 may be calculated by obtaining a normal vector to the roof section 52 (assuming the roof section 52 is coplanar). The sun position for the given time and location of the roof section 52 may be calculated. The roof normal azimuth (orientation $\gamma_s$) and elevation (tilt $\beta_s$) angles of the roof section 52 may be calculated, as shown in FIG. 6. Then, weather station data for the given hour and location may be obtained, such as from the weather database 36b, and data indicative of the Global Horizontal Irradiance (GHI), Direct Normal Irradiance (DNI), and Albedo (Ratio of reflected solar irradiance to global horizontal irradiance) may be obtained, such as from the solar radiation database 36c.

The irradiance calculator uses weather data describing the solar radiation and weather observations. The irradiance calculator may also use location information and time stamps to calculate hourly, for example, the sun position angles, and irradiance data to calculate the hourly plane irradiance values (which may be referred to as "Raw Irradiance HBEAM and Indirect"). Techniques for calculating the raw irradiance HBEAM and Indirect are described, for example, in the article "*Modeling Daylight Availability and Irradiance Components From Direct and Global Irradiance*," published in *Solar Energy*, Vol. 44, No. 5, pp. 271-289, 1990.

Once the Raw Irradiance HBEAM and Indirect is calculated, the irradiance and shadow impact, which together may be referred to herein as refined irradiance, for one or more of the vertices 64 of the areas 62 for the roof section 52 can be calculated as follows.

In one embodiment, for each vertex 64 of the areas 62 (such as triangular areas) in the roof section 52 and for every desired time interval (for example, the time interval parameter may be set by default to fifteen minutes), the sun position may be calculated based upon the location (such as latitude and longitude) of the vertex 64 (e.g., previously calculated) and using information from the solar radiation database 36c. In one embodiment, the sun position can be calculated using the National Oceanic and Atmospheric Administration Solar Position Calculator algorithm. In this example, the sun 11 is modeled as a point instead of a disk for making calculations faster. Then, the raw irradiance for the hour and the roof section 52 is obtained (HBeam and Indirect of roof section).

A ray is calculated between the selected vertex 64 and the sun position. The ray is then compared to the 3D point cloud 55 and/or to the 3D object model(s) 57 of the objects 56 to determine whether the ray passes through any obstructions identified in the 3D point cloud 55 and/or to the 3D object model(s) 57 of the objects 56. It should be noted that clusters of points 60 within the 3D point cloud 55 can be analyzed to locate obstructions. For example, techniques for identifying man-made and natural structures are specifically discussed within U.S. Pat. No. 10,402,676, which is incorporated herein by reference.

In one implementation, a mathematical model may be implemented to model the interaction of the ray with the object point cloud data to determine an effect on Raw Irradiance by the one or more objects that cast shade on the structure.

In on implementation, if an obstruction is located, then this affects the calculation of HBEAM irradiance. If an obstruction is not located, then it is determined that there is not a shadow. In this event, the algorithm adds to a value associated with the vertex 64 the roof raw HBEAM irradiance divided by the time slice (if the time interval is fifteen minutes, then the algorithm divides the roof raw HBEAM irradiance by four). Then, the algorithm adds to the value associated with the vertex 64 actual indirect irradiance for the point with Raw Indirect Irradiance divided by time slice (if the time interval is fifteen minutes, then the algorithm divides the roof Raw Indirect Irradiance by four). Optionally, the distance from the vertex 64 to the obstruction can be used to reduce the Raw Indirect Irradiance. This can be accomplished by using the distance from the vertex 64 to the obstruction to determine if the vertex 64 is within an umbra, penumbra, or antumbra of the obstruction. The shading affect is most in the umbra, less in the penumbra, and least in the antumbra. Thus, the Raw Indirect Irradiance is reduced the most when the shading effect is in the umbra, less in the penumbra, and least in the antumbra.

If the algorithm is configured so that shadow affects both Indirect irradiance and HBEAM (Hour Beam Irradiance): if the vertex 64 is not under shadow (no obstructions were found), then the algorithm adds to actual point HBEAM the roof raw HBEAM irradiance divided by the time slice (if the time interval is fifteen minutes then divides the roof raw HBEAM irradiance by four); adds actual indirect irradiance for the point with Raw Indirect Irradiance divided by time slice (if the time interval is fifteen minutes then divided the roof Raw Indirect Irradiance by four).

The algorithm accumulates shadow impact values for the vertex 64 if an obstruction is found, and stores point indirect and actual point (HBEAM) irradiance for the vertex 64, and calculates the Shadow Impact Percentage of solar access as: (ActualHBEAM+pointIndirect)/regionalEntitlement (pre-calculated max irradiance without reducing orientation effect or shadow impact). The Shadow Impact Percentage is the percentage of time over the period of time where this vertex 64 is under shadow. The Shadow Impact Percentage is also known as "TSFR."

After the calculations for each vertex 64 have been calculated, stored, and accumulated for all sub-periods throughout the selected period, for each area 62, the algorithm interpolates the accumulated values for the vertices 64 to calculate a solar access value for each area 62. Then, the algorithm exports results in all desired reports and formats.

Solar irradiance is a measure of the instantaneous power from the sun 11 on a surface over an area, typically given in the SI units of watts per square meter (W/m2). In the weather data from the National Solar Radiation Database (NSRDB 2014), each irradiance value is the total solar radiation in the sixty minutes ending at a given time step. These values represent the average solar power over a given hour in watt-hours per hour per square meter (Wh/h·m2). Therefore, area calculation for the roof subdivided triangles may be expressed also in square meters.

In the example of the weather database 36b and/or the solar radiation database 36c discussed herein, the weather data is stored as hourly values for the three components of solar irradiance: the total solar irradiance on a surface parallel to the ground (horizontal), called global horizontal irradiance; the portion of the solar irradiance that reaches a surface normal to the sun 11 in a direct line from the solar disk (typically assuming a measurement device with a five degree field of view), called beam normal or direct normal irradiance; and the solar irradiance on a horizontal surface from the atmosphere (sky) excluding the solar disc, or diffuse horizontal irradiance.

Insolation is a measurement of the energy from the sun 11 over a given time on a surface given in watt-hours per square meter (Wh/m2). The Regional Entitlement may be calculated as the annual insolation incident on the surface normal to the sun. The Regional Entitlement is the maximum quantity of insolation that can be captured at the latitude, and longitude of the structure 10. To calculate this value, the program logic 38 uses the same Irradiance calculator as discussed above, but instead of using the actual roof orientation, the program logic 38 uses a theorical perfect oriented roof plane. This can be done by starting with the surface normal to the sun 11 and then the surface may be tilted up and down to ensure that the maximum irradiance is captured (taking into account direct and indirect values).

The program logic 38 includes a sun position algorithm. The sun position algorithm can be implemented with techniques for calculating the sun's position, as disclosed in a method described in Michalsky, J. J. "The Astronomical Almanac's Algorithm for Approximate Solar Position (1950-2050)", Solar Energy, Vol. 40, No. 3, 1988; pp. 227-235, USA. In general, the sun's position can be calculated by calculating an effective time in hours for the current time step; calculating a sun angle for the current hour; determining the current day's sunrise and sunset time; determining the sunup flag for the current hour (sunup flag is an indicator if the sun 11 is over the horizon); and calculating an extraterrestrial radiation for the current hour. The techniques described by Michalsky return the angles in degrees and also as radians for the internal calculations. At the same time, such techniques provide calculated sin and cos of the azimuth and sin, cos of the zenith angles.

The first step in the sun position algorithm is to determine the effective time of the current time step. The code receives a geographic coordinate (e.g., lat, long) for the location along with the time including local day and time zone information.

The Julian day of year "jdoy" is the number of days since Noon on January 1 of the current year.

To account for leap years:

$$k = \begin{cases} 1 & \text{if year mod } 4 = 0 \\ 0 & \text{if year mod } 4 \neq 0 \end{cases} \tag{1}$$

Note this accounts for leap years to correctly calculate effective time, but is separated from the energy simulation, which may not account for leap years.

The number of days since January 1 may be calculated from the number of days in each of the months (January=31, February=28, March=31, etc.) before the current month, and the number of days since the first of the current month.

The Julian day of year is then:

$$jdoy = \begin{cases} day + a & \text{for January and February} \\ day + a + k & \text{for March through December} \end{cases} \quad (2)$$

The current decimal time of day expressed as an offset from UTC depends on the hour, minute of the current time stamp, and the time zone.

$$t_{utc} = hr + \frac{min}{60} - tz \quad (3)$$

For some combinations of time stamp and time zone, Equation 3 may yield a value less than zero or greater than twenty-four hours, in which case the following correction applies:

$$t_{utc} = t_{utc} + 24, \, jdoy = jdoy - 1 \quad \text{if } t_{utc} < 0 \quad (4)$$
$$t_{utc} = t_{utc} - 24, \, jdoy = jdoy + 1 \quad \text{if } t_{utc} > 24$$

The Julian date "julian" of the current hour is the Julian day of the preceding noon plus the number of hours since then. The Julian day is defined as the number of days since Noon on Jan. 1, 2000 (julian day (GMT) Truncation by Michalsky):

$$julian = 32916.5 + 365(yr - 1949) + \frac{yr - 1949}{4} + jdoy + \frac{t_{utc}}{24} - 51545 \quad (5)$$

The part of the program logic 38 for calculating sun angle information is referred to herein as the SunSite Calculator Module. The sun angles (FIG. 5) are the altitude angle $\alpha$, declination angle $\delta$, and zenith angle Z. The sun azimuth angle $\gamma$ can also be calculated for use in the incident irradiance calculations. The solar declination angle is not used in the incident irradiance calculations, but is required to calculate the sun azimuth angle. The sun angle equations are further described in Michalsky's *"The Astronomical Almanac's Algorithm for Approximate Solar Position (1950-2050)"*, Solar Energy, Vol. 40, No. 3, 1988; pp. 227-235, USA.

The first step in the sun angle calculation for a given time step is to determine the ecliptic coordinates of the location, which defines the position on the earth relative to the sun 11. The ecliptic coordinate variables are the mean longitude, mean anomaly, ecliptic longitude, and obliquity of the ecliptic. The algorithm uses ecliptic coordinates instead of equatorial coordinates to include the effect of the earth's inclination in the sun angle calculations.

Where limits are indicated for the equations below, if the variable's value falls outside of the limits, the value is adjusted. For example, for a value x with the limits $0 \leq x < 360°$, the SunSite Calculator Module divides x by 360°, and checks to see whether the remainder is less than zero, and if it is, adds 360° to the remainder:

$$a = x - 360° \, trunc\left(\frac{x}{360°}\right) \quad (6)$$
$$x = \begin{cases} a & \text{if } a \geq 0 \\ a + 360° & \text{if } a < 0 \end{cases}$$

Mean longitude may be specified in degrees ($0 \leq mnlong < 360°$). Note that the mean longitude may be the only value not converted to radians:

$$mnlong = 268.46 + 0.9856474 \, julian \quad (7)$$

Mean anomaly in radians ($0 \leq mnanom < 2\pi$):

$$mnanom = \frac{\pi}{180}(357.528 + 0.9856003 \, julian) \quad (8)$$

Ecliptic longitude in radians ($0 \leq eclong < 2\pi$):

$$eclong = \frac{\pi}{180}[mnlong + 1.915 \sin mnanom + 0.02 \sin(2 mnanom)] \quad (9)$$

Obliquity of ecliptic in radians:

$$obleq = \frac{\pi}{180}(23.439 - 0.0000004 \, julian) \quad (10)$$

The next step is to calculate the celestial coordinates, which are the right ascension and declination. The right ascension in radians:

$$ra = \begin{cases} \tan^{-1}\frac{\cos obleq \sin eclong}{\cos eclong} + \pi & \text{if } \cos eclong < 0 \\ \tan^{-1}\frac{\cos obleq \sin eclong}{\cos eclong} + 2\pi & \text{if } \cos obleq \sin eclong < 0 \end{cases} \quad (11)$$

The solar declination angle in radians:

$$\delta = \sin^{-1}(\sin obleq \sin eclong) \quad (12)$$

Next are the local coordinates, which require calculating the hour angle.

The Greenwich mean sidereal time in hours ($0 \leq gmst < 24$) with limits applied as show in the Equation (6) depends on the current time at Greenwich $t_{utc}$ from Equation (3) and Julian day from Equation (5):

$$gmst = 6.697375 + 0.065709242 \, julian + t_{utc} \quad (13)$$

Local mean sidereal time in hours ($0 \leq lmst < 24$):

$$lmst = gmst + \frac{lon}{15} \quad (14)$$

The hour angle in radians ($-\pi < HA < \pi$):

$$b = 15\frac{\pi}{180}lmst - ra$$

$$HA = \begin{matrix} b + 2\pi & \text{if } b < -\pi \\ b - 2\pi & \text{if } b > \pi \end{matrix}$$

The sun altitude angle in radians, not corrected for refraction:

$$a = \sin\partial\sin\frac{\pi}{180}lat + \cos\delta\cos\frac{\pi}{180}lat\cos HA \quad (15)$$

$$r = \begin{cases} \sin^{-1}a & \text{if } -1 \le a \le 1 \\ \frac{\pi}{2} & \text{if } a > 1 \\ -\frac{\pi}{2} & \text{if } a < 1 \end{cases}$$

The sun altitude angle $\alpha$ corrected for refraction can be calculated as set forth in Equation 16:

$$\alpha_{0d} = \frac{180}{\pi}\alpha_0 \quad (16)$$

$$r = \begin{cases} \alpha_{0d} + 3.51561\left(\frac{0.1594 + 0.0196\alpha_{0d} + 0.00002\alpha_{0d}^2}{1 + 0.505\alpha_{0d} + 0.0845\alpha_{0d}^2}\right) & \text{if } \alpha_{0d} > -0.56 \\ 0.56 & \text{if } \alpha_{0d} \le -0.56 \end{cases}$$

$$a = \begin{cases} \frac{\pi}{2} & \text{if } \alpha_{0d} + r > 90 \\ \frac{\pi}{180}(\alpha_{0d} + r) & \text{if } \alpha_{0d} + r \le 90 \end{cases}$$

The sun azimuth angle $\gamma$ in radians is from Iqbal, M. (1983) *An Introduction to Solar Radiation*. New York, NY: Academic Press.) rather than Michalsky 1988 referred to above, because the latter is only for northern hemisphere locations:

$$a = \frac{\sin\alpha_0\sin\left(\frac{\pi}{180}lat\right) - \sin\delta}{\cos\alpha_0\cos\left(\frac{\pi}{180}lat\right)} \quad (17)$$

$$b = \begin{cases} \cos^{-1}a & \text{if } -1 \le a \le 1 \\ \pi & \text{if } \cos\alpha_0 = 0, \text{ or if } a < -1 \\ 0 & \text{if } a > 1 \end{cases}$$

$$\gamma = \begin{cases} b & \text{if } HA < -\pi \\ \pi - b & \text{if } -\pi \le HA \le 0, \text{ or if } HA \ge \pi \\ \pi + b & \text{if } 0 < HA < \pi \end{cases}$$

The sun zenith angle Z in radians:

$$Z = \frac{\pi}{2} - \alpha \quad (18)$$

For the sunrise hour, the solar position angle is for the minute at the midpoint between the minute of sunrise and the end of the hour. For the sunset hour, the angle is for the midpoint between the beginning of the hour and sunset.

To determine whether the current time stamp is for an hour that contains a sunrise, or is a nighttime or daytime hour, the sunrise hour angle in radians is:

$$a = -\tan lat \tan\delta \quad (19)$$

$$HAR = \begin{cases} 0 & \text{if } a \ge 1 \quad \text{sun is down} \\ \pi & \text{if } a \le -1 \quad \text{sun is up} \\ \cos^{-1}a & \text{if } -1 < a < 1 \quad \text{sunrise hour} \end{cases}$$

The equation of time in hours:

$$a = \frac{1}{15}mnlong - \frac{\pi}{180}ra \quad (20)$$

$$EOT = \begin{cases} a & \text{if } = 0.33 \le a \le 0.33 \\ a + 24 & \text{if } a < -0.33 \\ a - 24 & \text{if } a > 0.33 \end{cases}$$

The sunrise time in local standard decimal time:

$$t_{sunrise} = 12 - \frac{1}{15}\frac{180}{\pi}HAR - \frac{\lambda}{15} - tz - EOT \quad (21)$$

And, the sunset in local standard time:

$$t_{sunset} = 12 + \frac{1}{15}\frac{180}{\pi}HAR - \frac{\lambda}{15} - tz - EOT$$

The position of sun 11 for hourly period that includes sunrise:

$$\min_{sunrise} = 60\left(\frac{(\text{hr} + 1 - t_{sunrise})}{2} + (t_{sunrise} - \text{hr})\right) \quad (22)$$

The position of sun 11 for hourly period that includes sunset:

$$\min_{sunset} = 60\frac{(t_{sunset} - \text{hr})}{2} \quad (23)$$

In one embodiment, the SunSite Calculator Module considers each roof section 52 to be a flat surface with one tilt angle $\beta_s$ and one azimuth angle (respect north) $\gamma_s$ that define the surface orientation, as shown in the example illustrated in FIG. 6. These surface angles may be based on and/or generated from information from the 3D model of the structure 10.

The surface angle equations may be based on standard geometric relationships defined by the surface orientation and sun angles.

For the raw irradiance initial calculation, the surface angle regarding the sun 11 uses the half of the hour sun position (except for the hours containing the sunrise and the sunset).

The angle of incidence (AOI) is the sun incidence angle defined as the angle between beam irradiance and a line normal to the subarray surface (see FIG. 6). The angle of incidence is a function of the sun azimuth angle $\gamma$, sun zenith angle Z, surface azimuth angle $\gamma_s$, and the surface tilt angle $\beta_s$:

$$a = \sin Z \cos(\gamma - \gamma_s)\sin\beta_s + \cos Z \cos\beta_s \quad (24)$$

$$AOI = \begin{cases} \pi & \text{if } a < -1 \\ 0 & \text{if } a > 1 \\ \cos^{-1}a & \text{if } -1 \leq a \leq 1 \end{cases}$$

The incident irradiance, also called plane-of-array irradiance or POA irradiance, is the solar irradiance incident on the roof section plane in a given time step. The SunSite Calculator Module may calculate the incident irradiance for the sunrise hour, sunup hours, and sunset hour. An incident angle algorithm may calculate the hourly beam and diffuse irradiance incident on the roof section surface for a given sun position, latitude, and surface orientation. For each time step in the simulation, the incident irradiance algorithm steps are:

nents from Direct and Global Irradiance." (Perez, R.; Ineichen, P.; Seals, R.; Michalsky, J.; Stewart, R. (1990), Solar Energy (44:5); pp. 271-289) ("Perez 1990"); the contents of both of which are hereby incorporated in their entirety herein.

The implementation of the present disclosure includes a modification of the Perez model that treats diffuse radiation as isotropic for 87.5°≤Z≤90°. For a general description of the model, see also, "Perez Sky Diffuse Model 2014" (Modeling Steps. PV Performance Modeling Collaborative. Albuquerque, NM: Sandia National Laboratories), the content of which is hereby incorporated in its entirety herein.

The Perez model uses empirical coefficients in the following table derived from measurements over a range of sky conditions and locations instead of mathematical representations of the sky diffuse components.

|  | f11 | f12 | f13 | f21 | f22 | f23 |
|---|---|---|---|---|---|---|
| $\varepsilon \leq 1.065$ | −0.0083117 | 0.5877285 | −0.0620636 | −0.0596012 | 0.0721249 | −0.0220216 |
| $\varepsilon \leq 1.23$ | 0.1299457 | 0.6825954 | −0.1513752 | 0.0189325 | 0.065965 | −0.0288748 |
| $\varepsilon \leq 1.5$ | 0.3296958 | 0.4868735 | −0.2210958 | 0.055414 | −0.0639588 | −0.0260542 |
| $\varepsilon \leq 1.95$ | 0.5682053 | 0.1874525 | −0.295129 | 0.1088631 | −0.1519229 | −0.0139754 |
| $\varepsilon \leq 2.8$ | 0.873028 | −0.3920403 | −0.3616149 | 0.2255647 | −0.4620442 | 0.0012448 |
| $\varepsilon \leq 4.5$ | 1.1326077 | −1.2367284 | −0.4118494 | 0.2877813 | −0.8230357 | 0.0558651 |
| $\varepsilon \leq 6.2$ | 1.0601591 | −1.5999137 | −0.3589221 | 0.2642124 | −1.127234 | 0.1310694 |
| $\varepsilon > 6.2$ | 0.677747 | −0.3272588 | −0.2504286 | 0.1561313 | −1.3765031 | 0.2506212 |

1. Calculate the beam irradiance on a horizontal surface.
2. Check to see if the beam irradiance on a horizontal surface exceeds the extraterrestrial radiation.
3. Calculate the angle of incidence.
4. Calculate the incidence beam irradiance.
5. Calculate the sky diffuse horizontal irradiance using Perez.
6. Calculate the ground-reflected irradiance.

The incident beam irradiance is solar energy that reaches the surface in a straight line from the sun:

$$I_b = E_b \cos AOI \quad (25)$$

The beam irradiance on a horizontal surface:

$$I_{bh} = E_b \cos Z \quad (26)$$

The calculator compares $I_{bh}$ and the extraterrestrial radiation H, if $I_{bh}$>H the calculation is invalid and a value of 9999 is set to the rest of the raw irradiance calculation to indicate that an error has occurred.

Incident sky diffuse irradiance $I_d$ is solar energy that has been scattered by molecules and particles in the earth's atmosphere before reaching the surface of the roof.

Perez sky diffuse irradiance model was adapted from NREL SAM, that was adapted from PVWatts Version 1 (Dobos 2013a) Dobos, A. (2013). "*PVWatts Version 1 Technical Reference.*" TP-6A20-60272. Golden, CO: National Renewable Energy Laboratory. Accessed Feb. 20, 2014. and is described in Perez, R.; Stewart, R.; Seals, R.; Guertin, T. (1988) "The Development and Verification of the Perez Diffuse Radiation Model." SAN88-7030. Albuquerque, NM: Sandia National Laboratories. ("Perez 1988") and in "Modeling Daylight Availability and Irradiance Compo- The parameters a and b describe the view of the sky from the perspective of the surface:

$$a = \max(0, \cos AOI) \quad (27)$$
$$b = \max(\cos 85°, \cos AOI)$$

The sky clearness $\varepsilon$ with $\kappa$=1.041 (Perez 1990) and the sun zenith angle Z in radians:

$$\varepsilon = \frac{(E_d + E_b)/E_d + \kappa Z^3}{1 + \kappa Z^3} \quad (28)$$

Where $E_d$ is the horizontal diffuse irradiance and $E_b$ the diffuse normal irradiance ($E_b$=max(min(min(GHI,1353), DNI cos Z), 0)).

The sky clearness noted as $\Delta$ given by:

$$d = 0.40928\sin(0.017203(284.0 + JOY)) \quad (29)$$

$$H_{x1} = \cos\lambda\cos d(\sin W_2 - \sin W_1) + \sin\lambda\sin d(W_2 - W_1)$$

$$(R_{av}/R)^2 = (1 + 0.033\cos(\frac{2\pi JOY}{365.2422}))\frac{H_{x1}}{(W_2-)}$$

$$\frac{AM}{E_a} = \frac{1}{E_{sc}(R_{av}/R)^2}$$

$$\Delta = E_d \frac{AM}{E_a}$$

Where $\lambda$ is the latitude, $\theta$ is the longitude and $W_1$ and $W_2$ factors are angles base on extraterrestrial time of previous ($LST_{ph}$) and current hour ($LST_{ch}$) calculation, and are given by:

$$W_s = \cos^{-1}(\max(-1, \min(1, -\tan(Sun_{decl})\tan\lambda)))  \quad (30)$$

$$W_1 = \max(((LST_{ph} - \text{floor}(\frac{LST_{ph}}{24})*24) - 12)*15 + (\theta - 15*Tz), -W_s)$$

$$W_1 = \max(((LST_{ch} - \text{floor}(\frac{LST_{ch}}{24})*24) - 12)*15 + (\theta - 15*Tz), -W_s)$$

The coefficients $F_1$ and $F_2$ are empirical functions of the sky clearness ε and describe circumsolar and horizon brightness, respectively. The sun zenith angle Z is in radians:

$$F_1 = \max[0, (f_{11}(\varepsilon) + \Delta f_{12}(\varepsilon) + Z f_{13}(\varepsilon))]  \quad (31)$$

$$F_2 = f_{21}(\varepsilon) + \Delta f_{22}(\varepsilon) + Z f_{23}(\varepsilon)$$

The SunSite Calculator Module may use a lookup table with empirical values show in the above table to determine the value of the f coefficients in the Equation (31).

Finally, the diffuse irradiance component is defined by the equation:

$$D_i = \begin{cases} E_d\left(0.5(1-F_1)(1+\cos\beta_s) + F_1\frac{a}{b} + F_2*\sin\beta_s\right) & \text{if } (DNI\cos Z) > 0 \\ 0.5 E_d(1+\cos\beta_s) & \text{if } (DNI\cos Z) \le 0 \end{cases} \quad (32)$$

The incident ground-reflected irradiance is solar energy that reaches the array surface after reflecting from the ground. The ground reflects light diffusely, so the ground-reflected irradiance is diffuse irradiance. As set forth in Equation 33, it is a function of the beam normal irradiance and sun zenith angle, sky diffuse irradiance, and ground reflectance (albedo). See Liu, B.; Jordan, R. (1963). "*A Rational Procedure for Predicting The Long-term Average Performance of Flat-plate Solar-energy Collectors.*" Solar Energy (7:2); pp. 53-74.

$$I_r = \rho(E_b \cos Z + E_d)\frac{(1-\cos\beta)}{2}  \quad (33)$$

The albedo (ρ) may be obtained from the weather station data, as previously discussed.

The calculated raw irradiance values for the roof section plane are kept separated, outputs as indirect irradiance ($II=D_i+I_r$) and beam irradiance ($I_b$) (see Equation (25)).

These raw values are then cached for each roof section 52 and used on the Solar Access percentage calculation in each point of interest.

The effective point irradiance is the incident irradiance indirect plus direct beam of the roof section less losses due to object shading. This calculation is known in the solar industry as TSRF (Total Solar Resource Fraction). This is the amount of sunlight measured area will receive over the year. The Regional Entitlement is used as a maximum possible value. The Solar Access is then calculated as the percentage of usable point irradiance versus Regional Entitlement.

The Regional Entitlement is calculated as the ideal irradiance values to a perfect sun-oriented plane without any obstruction. The SunSite Calculator Module may simulate tilt changes starting on the sun zenith up and down to find the maximum possible irradiance (accounting for diffuse and ground reflection irradiance), at the given hour based on weather data.

To calculate the effective point irradiance, the SunSite Calculator Module may use the Solar Calculator to find the sun position every configured fragment of time (for example, fifteen minutes by default), and perform ray tracing to find on the rest of the 3D model or an obstruction in the 3D point cloud 55 if there is any other surface that blocks the direct ray from the sun 11 to the selected point over the roof section. See for example, FIG. 7 illustrating an example of shadow tracing. Various amounts of irradiance are represented using specific indicia 59 in FIG. 7. For example, the diagram may use shading or colors as the indicia, such as the colors blue 59a, red 59b, and yellow 59c, to indicate various amounts of irradiance. In one implementation, the areas represented in a first color, such as blue, are where it is not possible to have direct sun irradiance (because of the roof angle), areas represented in a second color, such as yellow, are where there is direct sun irradiance, and areas represented in a third color, such as red, are where there should be sun irradiance, but such areas are under shadow by an obstruction element.

$$s = \begin{cases} 0 & \text{if no obstruction if found in ray from sun to POI} \\ 1 & \text{if obstruction if found in ray from sun to POI} \end{cases} \quad (34)$$

The $FP_i$ (final point irradiance) then is calculated as:

$$FP_i = \begin{cases} \sum_{s=0} I_b + D_i + I_r & \text{if shadow affect all irradiance} \\ \sum_{s=0} I_b + \sum_{s=0 \text{ or } 1} D_i + I_r & \text{if shadow affect only beam irradiance} \end{cases} \quad (35)$$

An exemplary use of one embodiment of the apparatus 6 and method will now be described. A user may request a solar analysis of a particular structure 10 in order for the user to determine the amount of solar access of one or more portions of the structure 10. The user may input location information indicative of location of the structure 10. The location information may be in the form of a postal address, GPS coordinates, or any other form indicative of the location of the structure 10 on the Earth.

In one embodiment, in the first step of the method, the apparatus 6 may receive the location information and then may generate, retrieve, or receive a 3D model of the structure 10, based at least in part on the location information, such as from the 3D Model database 36a. The 3D model of the structure 10 may be geo-referenced such that the geographic location on the earth of points in the 3D model are stored or associated with the points in the 3D model.

In a second step, the method may generate, retrieve, or receive the 3D point cloud 55 indicative of the area and/or objects 56 in proximity to the structure 10, based at least in part on the location information, such as from the three-dimensional object database 36d. The 3D point cloud 55 is indicative of an actual size, shape, and location of the area and/or objects 56. The 3D point cloud 55 may be generated from one or more georeferenced images, such as from the image capturing system 12.

In one embodiment, the method may generate one or more of the object model 57 of the area and/or objects 56 in proximity to the structure 10. The object model 57 may more accurately depict the size, shape, and location of the object 56 in comparison to models generated using LIDAR data and in comparison to manually added stock models.

The method may determine and/or divide the roof (or other parts) of the structure 10 in the 3D model of the structure 10 into one or more of the roof sections 52. The method may determine and/or divide the roof sections 52 into one or more of the areas 62 having the vertices 64.

Next, the method may determine the Raw Irradiance for one or more of the roof sections 52, as described in relation to the algorithms above. Once the Raw Irradiance is determined for a roof section 52, the method may determine the punctual irradiance and shadow impact for the structure 10, by carrying out the above described algorithms for the vertices 64 of the areas 62 of the roof sections 52.

The method may then export or otherwise make available outputs indicative of information regarding the structure 10 and the solar access of particular portions of the structure 10, such as the roof of the structure 10.

FIGS. 8A-8M are exemplary outputs of the apparatus 6 and method described. The outputs may be in the form of a display on a digital screen, a paper report, or in any other suitable format. The outputs may include one or more of percentage of annual solar access and/or total solar resource fraction for the vertices 64, the areas 62, and/or the roof sections 52 of the roof of the structure 10, as illustrated in FIGS. 8A-8E. The Solar Access is the percentage of sun time that the given point receives (Solar Access is the inverse of the Shadow Impact mentioned before as being stored for each vertex), and the TSRF is what we call Solar Access during the calculations (and in the code), that is, the actual irradiance divided by the Regional Entitlement. The percentages may be displayed numerically and/or may be displayed using different colors to indicate different levels of solar access. The colors indicative of the percentages may be overlaid on the 3D model of the structure 10. A grid may be overlaid on the 3D model of the structure 10 to help pinpoint particular positions on the structure 10. The percentages may be given for seasonal time periods. For example, the percentage may be given for a block of time from May to October as a first seasonal time period and the percentage may be given for a block of time from November to April as a second seasonal time period. As another non-exclusive example, the percentage may be given by month.

Further, the outputs may include "fisheye views" which may represent the viewpoint from a particular vertex 64 and/or a particular area 62, as shown in FIG. 8F. The fisheye view may include a view of how the object models 57 and the sun 11 in the sky would appear from a particular position viewpoint, such that a user could understand the obstructions between the sun 11 and that particular position.

Figure 8A:
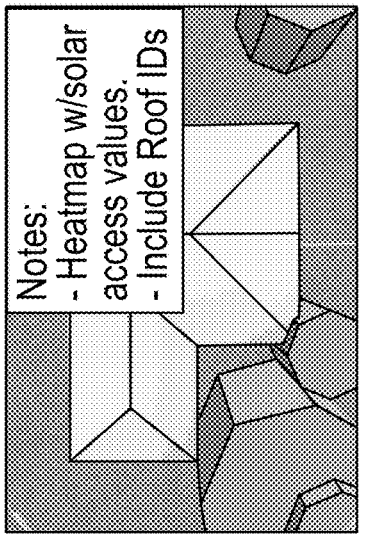
Figure 8D:
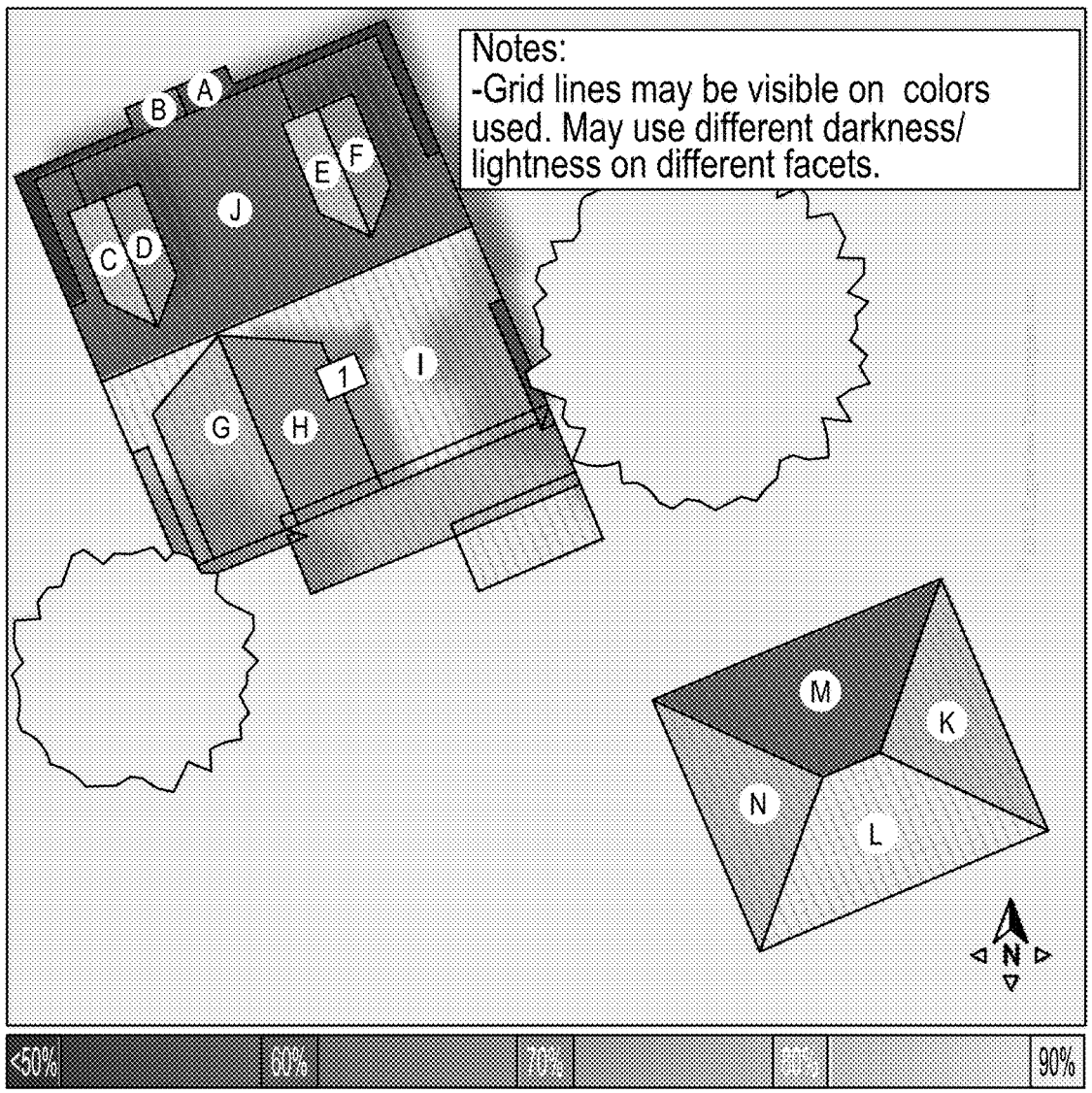
Figure 8G:
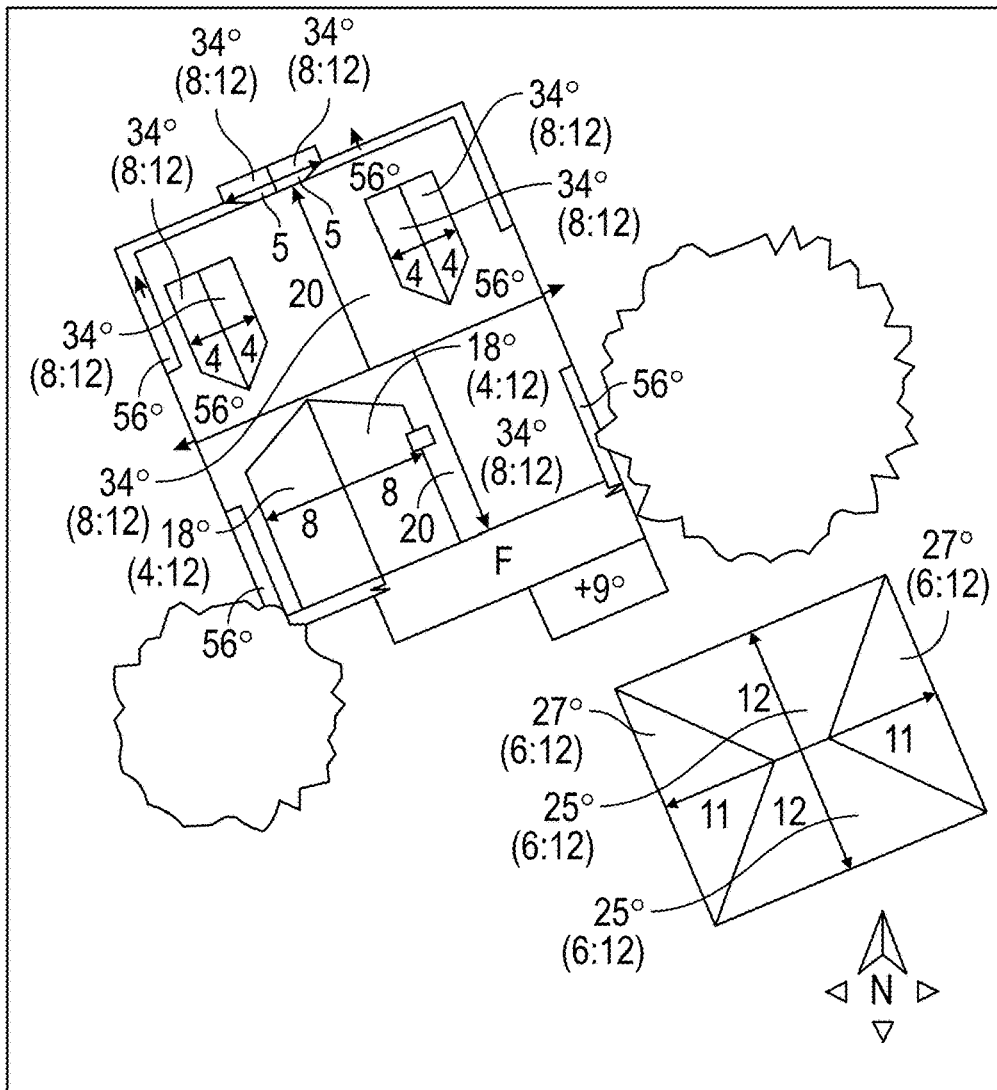

The outputs may include one or more measurements of the structure 10 and/or characteristics of the structure, as exemplified in FIG. 8A, FIG. 8B, and FIG. 8G. The outputs may include rafter lengths, pitches, distances, and other measurements of the roof of the structure 10, to assist in planning the installation of and installing solar equipment on the structure 10.

Figure 8H:
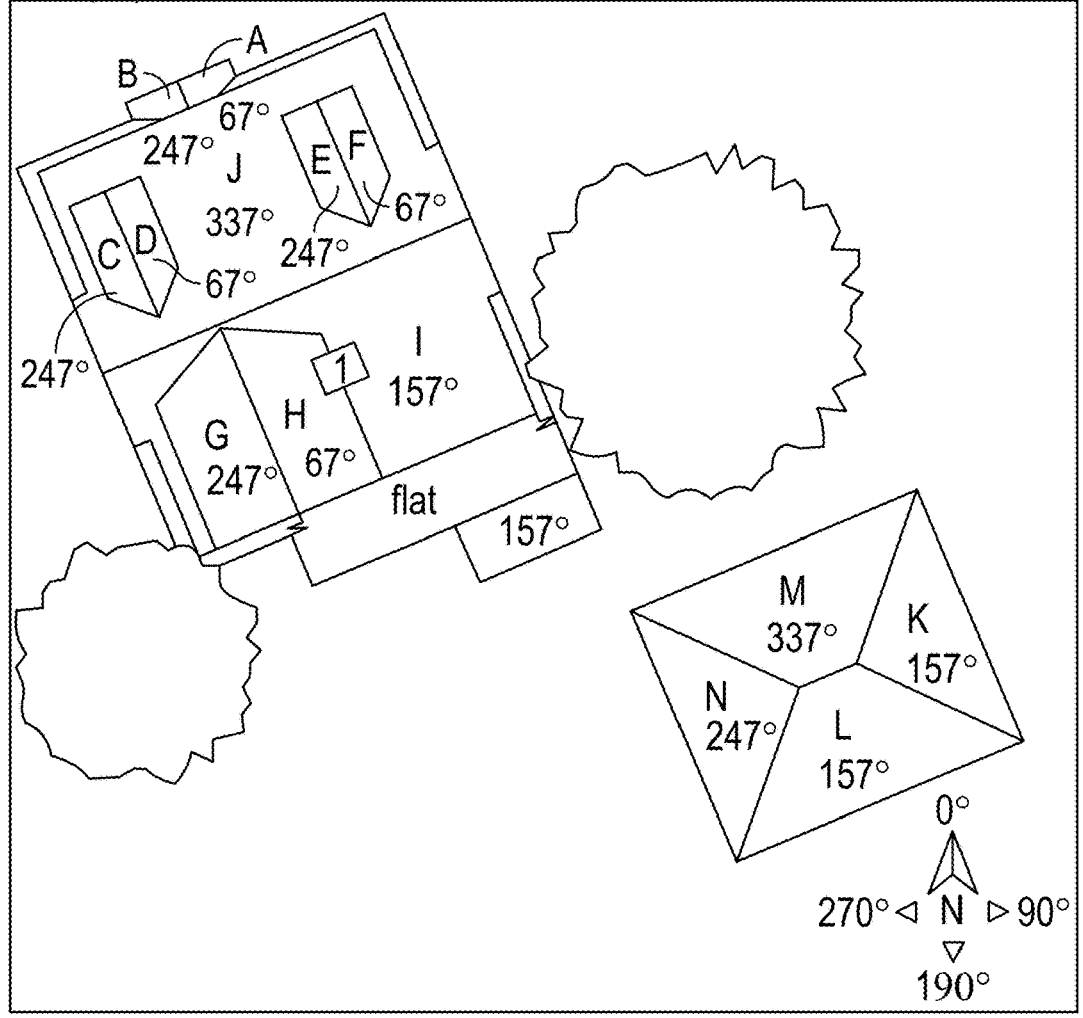
Figure 8J:
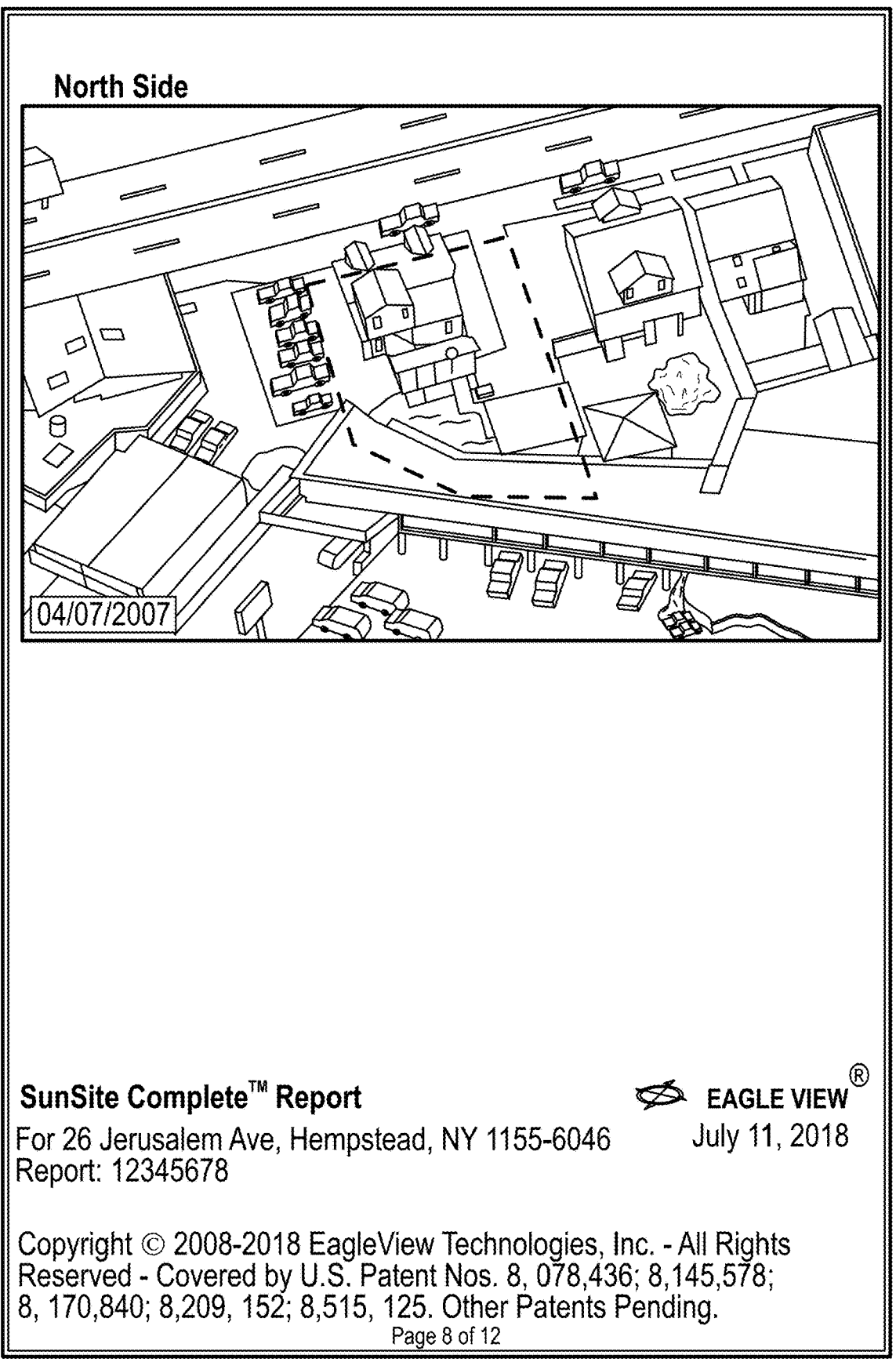
Figure 8K:
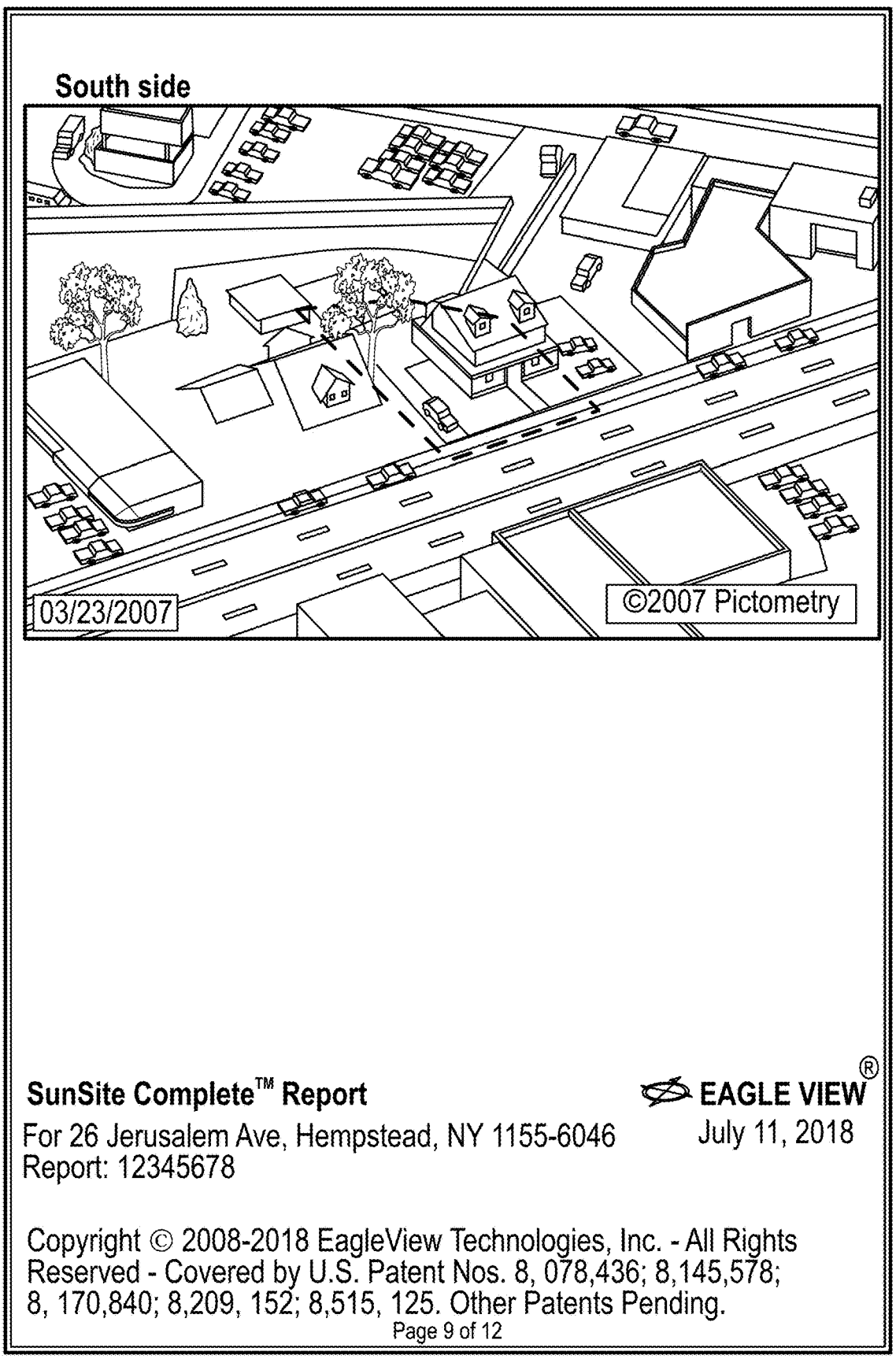

The outputs may include the orientation of the structure 10 to true north, as shown in the example of FIG. 8H.

The outputs may include one or more images of the structure 10, such as the examples shown in FIGS. 8I-8M. In one embodiment, the outputs may include one or more aerial nadir and/or aerial oblique images of the structure 10. In one embodiment, the outputs may include one or more aerial oblique images taken from each side of the structure 10 and/or from each cardinal direction. In one embodiment, the outputs may include one or more aerial nadir and/or aerial oblique images of the roof 8 of the structure 10. In some embodiments, an outline of the parcel boundary may be overlaid on the one or more images.

Once the user has the outputs, the user may then determine whether the structure 10 is suitable for installation of solar arrays or other solar capture devices (including water based, electrical based, air based, and other solar devices) based on the amount of solar access available on the structure 10. The outputs may be used by the user to determine the location on the structure 10 to install solar arrays in order that the solar arrays receive the most solar access, taking into consideration, of course, other practical factors, such as other roof feature, roof size, load bearing capacity, and so on. The user may then install or cause to be installed the solar arrays, or other solar capture devices, on the structure 10.

The present disclosure provides a non-conventional, technical solution to pre-existing problems involved in determining Solar Access and Total Solar Resource Fraction for the structure 10. Conventional instruments that are placed on site are expensive and have a variety of drawbacks including safety issues involved in placing and removing the instruments. With the presently disclosed and non-conventional apparatus 6, Solar Access and Total Solar Resource Fraction for the structure 10 are remotely determined using imagery of the structure 10 and surrounding areas, and there is no need for a site visit or the placement and removal of instruments on the structure 10.

Conventional software for determining Solar Access and Total Solar Resource Fraction suffer from numerous drawbacks due to the manual placement, shaping, and sizing of obstructions relative to the structure for taking into account the shadow impact due to the obstructions. Further, the conventional software used a binary "full shade/full sun" assumption that ignored diffuse light, which lead to over-prediction of shade impact from nearby obstructions, or an irradiance map that lead to under-prediction of shape impact.

A conventional solution to this problem was to manually model obstructions relative to a house by creating a projected cylinder around the entire house, or model the shade objects at the roof edge. See "Combining Solmetric SunEye data with simple 3D modeling to improve residential photovoltaic shade impact predictions" by Stephen Pisklak, John McKeen, and Paul Del Mar of Dow Chemical, located in Midland MI, 48667, USA. The presently disclosed and non-conventional apparatus 6, however, uses data obtained from the 3D point cloud 55 that is indicative of the size, shape, and distance of the obstructions from the structure 10 to improve the operation of the computer system 14 in calculating the Solar Access and Total Solar Resource Fraction. Knowing the distance from the vertex 64 to the obstruction (as represented in the 3D point cloud 55, for example) permits the presently disclosed apparatus 6 to reduce the Raw Indirect Radiance value, thereby improving the accuracy of the calculated Solar Access and Total Solar Resource Fraction and treating the Raw Irradiance, and Raw Indirect Radiance differently when calculating the Solar Access and Total Solar Resource Fraction.

Further, the system and methodology described herein can be executed autonomously by the computer system 14 and without human intervention to generate Solar Access reports for many structures 10. This can be accomplished by the computer system 14 using the imagery to generate the 3D point cloud 55, and then using portions of the 3D point cloud 55 to model the obstructions relative to the 3D model of the roof 8 of the structure 10 to determine the shade impact. This is a significant improvement over conventional techniques that required human intervention to manually place and/or size the obstructions in the model used to calculate the Solar Access and Total Solar Resource Fraction.

Although the preceding description has been described herein with reference to particular means, materials, and embodiments, it is not intended to be limited to the particulars disclosed herein; rather, it extends to all functionally equivalent structures, methods, and uses, such as are within the scope of the appended claims.

What is claimed is:

1. A method for determining solar access, comprising:
determining a solar access value for a vertex of a structure by:
calculating a ray between a sun position and the vertex at a plurality of time periods;
comparing a path of the ray to location of points in object point cloud data representative of the size, shape, and location of one or more objects in relation to the path of the ray to determine that the one or more objects blocks the ray from reaching the vertex, resulting in a shadow over the vertex for at least one of the plurality of time periods;
determining maximum possible irradiance values at the vertex for the plurality of time periods, the maximum possible irradiance values based on solar radiation of the rays from above the vertex at the plurality of time periods and on solar irradiance from surrounding ground and atmospheric refractions to the vertex at the plurality of time periods;
determining a distance between the one or more objects blocking the ray from reaching the vertex and the vertex, based on the location of the one or more objects and a location of the vertex;
determining effects of the shadow over the vertex on the maximum possible irradiance values for the at least one of the plurality of time periods based on the determined distance and whether the vertex is within an umbra, penumbra, or antumbra of the shadow at the at least one of the plurality of time periods; and
determining irradiance in Watts per time period over the plurality of time periods in which the shadow is over the vertex.

2. The method of claim 1, further comprising:
generating one or more three-dimensional geo-referenced object models of the one or more objects using the object point cloud data.

3. The method of claim 1, wherein calculating the ray between the sun position and the vertex is based at least in part on a latitude and longitude of the vertex and information from a solar radiation database.

4. The method of claim 1, further comprising calculating sun position for a given time and location.

5. The method of claim 4, wherein the given time is a sub-period of a selected period of time.

6. The method of claim 1, further comprising calculating azimuth and tilt angles for an orientation of one or more areas of the structure.

7. The method of claim 1, wherein the maximum possible irradiance values are further based on historical weather data indicative of sky clearness.

8. The method of claim 1, wherein the vertex is a first vertex in a plurality of vertices of the structure, the method comprising:
determining a corresponding solar access value for each of the plurality of vertices; and
determining an accumulated solar access value for one or more areas of the structure based on the determined solar access values at the plurality of vertices.

9. The method of claim 8, further comprising generating a report indicative of the accumulated solar access value for the one or more areas.

10. The method of claim 8, further comprising generating an output comprising the accumulated solar access value for the one or more areas, wherein the one or more areas include one or more portions of a roof of the structure.

11. A system for determining solar access of a structure, comprising:
a computer system having one or more processors; and,
one or more non-transitory computer readable medium accessible by the computer system and storing instructions that when executed by the one or more processors of the computer system cause the one or more processors to:
determine a solar access value for a vertex of a structure by:
calculating a ray between a sun position and the vertex at a plurality of time periods;
comparing a path of the ray to location of points in object point cloud data representative of the size, shape, and location of one or more objects in relation to the path of the ray to determine that the one or more objects blocks the ray from reaching the vertex, resulting in a shadow over the vertex for at least one of the plurality of time periods;
determining maximum possible irradiance values at the vertex for the plurality of time periods, the maximum possible irradiance values based on solar radiation of the rays from above the vertex at the plurality of time periods and on solar irradiance from surrounding ground and atmospheric refractions to the vertex at the plurality of time periods;
determining a distance between the one or more objects blocking the ray from reaching the vertex and the vertex, based on the location of the one or more objects and a location of the vertex;
determining effects of the shadow over the vertex on the maximum possible irradiance values for the at least one of the plurality of time periods based on the determined distance and whether the vertex is within an umbra, penumbra, or antumbra of the shadow at the at least one of the plurality of time periods; and
determining irradiance in Watts per time period over the plurality of time periods in which the shadow is over the vertex.

12. The computer system of claim 11, the one or more non-transitory computer readable medium further storing instructions that when executed by the one or more processors of the computer system cause the one or more processors to:
generate one or more three-dimensional geo-referenced object models of the one or more objects using the object point cloud data.

13. The computer system of claim 11, wherein calculating the ray between the sun position and the vertex is based at least in part on a latitude and longitude of the vertex and information from a solar radiation database.

14. The computer system of claim 11, further comprising calculating sun position for a given time and location.

15. The system of claim 14, wherein the given time is a sub-period of a selected period of time.

16. The computer system of claim 11, further comprising calculating azimuth and tilt angles for an orientation of one or more areas of the structure.

17. The computer system of claim 11, wherein the maximum possible irradiance values are further based on historical weather data indicative of sky clearness.

18. The computer system of claim 11, wherein the vertex is a first vertex in a plurality of vertices of the structure, and the one or more non-transitory computer readable medium further storing instructions that when executed by the one or more processors of the computer system cause the one or more processors to:
   determine a corresponding solar access value for each of the plurality of vertices; and
   determine an accumulated solar access value for one or more areas of the structure based on the determined solar access values at the plurality of vertices.

19. The computer system of claim 18, the one or more non-transitory computer readable medium further storing instructions that when executed by the one or more processors of the computer system cause the one or more processors to:
   generate a report indicative of the accumulated solar access value for the one or more areas.

20. The computer system of claim 18, the one or more non-transitory computer readable medium further storing instructions that when executed by the one or more processors of the computer system cause the one or more processors to:
   generate an output comprising the accumulated solar access value for the one or more areas, wherein the one or more areas include one or more portions of a roof of the structure.

\* \* \* \* \*